United States Patent
Wiseman

(10) Patent No.: US 11,423,918 B2
(45) Date of Patent: Aug. 23, 2022

(54) DIRECTIONAL DIFFERENTIAL PRESSURE DETECTOR

(71) Applicant: AirFlow Direction, Inc., West Newbury, MA (US)

(72) Inventor: Brian M. Wiseman, West Newbury, MA (US)

(73) Assignee: AirFlow Direction, Inc., West Newbury, MA (US)

( * ) Notice: Subject to any disclaimer, the term of this patent is extended or adjusted under 35 U.S.C. 154(b) by 706 days.

(21) Appl. No.: 16/427,153

(22) Filed: May 30, 2019

(65) Prior Publication Data

US 2020/0378854 A1  Dec. 3, 2020

(51) Int. Cl.
*B60C 23/04* (2006.01)
*G10L 19/10* (2013.01)
*G01L 13/00* (2006.01)

(52) U.S. Cl.
CPC .............. *G10L 19/10* (2013.01); *G01L 13/00* (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/143; G01L 19/14; G01L 17/00; G01L 7/18; G01L 15/00; G01L 19/0092; G01L 9/0051; G01L 7/041; G01L 9/065; G01L 9/12; G01L 19/0618; G01L 9/0052; G01L 7/16; G01L 9/125; G01L 19/0609; G01L 9/007; G01L 19/003; G01L 19/0627; G01L 9/0022; G01L 19/0046; G01L 9/06; G01L 7/084; G01L 19/0636; G01L 13/02; G01L 19/0023; G01L 19/142; G01L 7/043; G01L 19/08; G01L 9/0002; G01L 9/008; G01L 19/02; G01L 19/141; G01L 9/006;

(Continued)

(56) References Cited

U.S. PATENT DOCUMENTS 2,497,255 A    2/1950  Brown
2,542,442 A    2/1951  Weber (Continued)

FOREIGN PATENT DOCUMENTS

FR    2 428 845 A1    1/1980
GB      394 145 A1    6/1933

(Continued)

OTHER PUBLICATIONS

U.S. Appl. No. 16/752,188, filed Jan. 24, 2020, Wiseman.

(Continued)

*Primary Examiner* — Andre J Allen
(74) *Attorney, Agent, or Firm* — Wolf, Greenfield & Sacks, P.C.

(57) ABSTRACT

Methods and apparatuses for indicating the presence of a threshold directional differential pressure between separated adjacent spaces. A conduit contains at least one movable element that indicates whether the pressure difference between the two spaces is at least as high as a threshold pressure difference. The apparatus is adjustable to have different threshold set points by adjusting the pivot arm inclination relative to a horizontal plane.

25 Claims, 17 Drawing Sheets

(58) Field of Classification Search
CPC ......... G01L 11/02; G01L 23/18; G01L 23/10; G01L 19/0672; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 9/16; G01L 27/007; G01L 11/00; G01L 27/002; G01L 9/0026; G01L 19/00; G01L 9/0089; G01L 9/045; G01L 9/14; G01L 1/2281; G01L 11/025; G01L 11/008; G01L 19/0654; G01L 7/22; G01L 9/0047; G01L 13/026; G01L 9/0076; G01L 9/0025; G01L 9/0035; G01L 13/00; G01L 19/0061; G01L 9/0005; G01L 9/08; G01L 9/10; G01L 9/0019; G01L 11/006; G01L 21/00; G01L 7/08; G01L 9/04; G01L 9/0041; G01L 9/0008; G01L 11/004; G01L 19/083; G01L 19/086; G01L 9/0057; G01L 1/18; G01L 19/069; G01L 19/10; G01L 9/16; G01L 13/023; G01L 7/048; G01L 9/0016; G01L 9/0027; G01L 9/0086; G01L 9/0048; G01L 9/0079; G01L 11/04; G01L 19/06; G01L 9/00; G01L 9/0091; G01L 23/24; G01L 7/182; G01L 11/002; G01L 19/0663; G01L 27/00; G01L 7/166; G01L 1/20; G01L 23/22; G01L 9/0036; G01L 1/02; G01L 9/0061; G01L 9/0039; G01L 23/125; G01L 9/0013; G01L 9/0092; G01L 21/04; G01L 19/145; G01L 7/104; G01L 9/0045; G01L 9/0033; G01L 9/0083; G01L 9/0098; G01L 1/142; G01L 7/24; G01L 1/2293; G01L 9/0029; G01L 21/22; G01L 9/02; G01L 7/022; G01L 9/0064; G01L 23/08; G01L 23/16; G01L 5/14; G01L 7/088; G01L 7/163; G01L 9/0007; G01L 1/205; G01L 23/222; G01L 9/0085; G01L 1/16; G01L 1/2212; G01L 1/2287; G01L 13/06; G01L 9/0004; G01L 21/14; G01L 23/02; G01L 9/003; G01L 9/025; G01L 9/085; G01L 1/14; G01L 1/148; G01L 9/0058; G01L 9/105; G01L 7/061; G01L 9/002; G01L 7/02; G01L 1/2231; G01L 13/028; G01L 23/28; G01L 9/0095; G01L 1/162; G01L 7/12; G01L 9/0032; G01L 9/0038; G01L 19/0076; G01L 7/024; G01L 21/10; G01L 1/246; G01L 19/149; G01L 7/086; G01L 1/005; G01L 7/06; G01L 7/102; G01L 1/2206; G01L 13/021; G01L 27/02; G01L 5/228; G01L 1/2262; G01L 23/00; G01L 9/0094; G01L 1/24; G01L 9/0082; G01L 1/125; G01L 1/26; G01L 11/06; G01L 9/0097; G01L 1/2268; G01L 21/30; G01L 21/34; G01L 23/221; G01L 7/20; G01L 19/144; G01L 23/26; G01L 7/068; G01L 1/225; G01L 23/32; G01L 7/14; G01L 1/144; G01L 1/165; G01L 23/12; G01L 7/187; G01L 1/146; G01L 1/241; G01L 7/045; G01L 1/086; G01L 7/108; G01L 13/04; G01L 17/005; G01L 5/18; G01L 9/18; G01L 1/127; G01L 1/22; G01L 1/245; G01L 21/32; G01L 1/183; G01L 1/2218; G01L 9/0023; G01L 1/243; G01L 23/145; G01L 5/0047; G01L 9/0088; G01L 1/106; G01L 5/0076; G01L 1/10; G01L 1/186; G01L 23/223; G01L 25/00; G01L 5/165; G01L 9/001; G01L 9/0017; G01L 1/044; G01L 3/245; G01L 5/226; G01L 1/08; G01L 21/16; G01L 3/1485; G01L 5/0052; G01L 5/162; G01L 5/225; G01L 7/026; G01L 7/065; G01L 9/0014; G01L 1/242; G01L 21/24; G01L 3/10; G01L 5/0004; G01L 9/005; G01L 1/00; G01L 1/04; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/243; G01L 1/083; G01L 1/12; G01L 21/36; G01L 23/04; G01L 23/14; G01L 23/30; G01L 3/103; G01L 5/00; G01L 5/0028; G01L 5/102; G01L 5/133; G01L 5/166; G01L 7/185; G01L 1/255; G01L 21/08; G01L 5/0033; G01L 5/0057; G01L 5/161; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .............................................. 73/146–146.8
See application file for complete search history.

(56) References Cited

U.S. PATENT DOCUMENTS

| | | |
|---|---|---|
| 3,397,319 A | 8/1968 | Locke |
| 3,815,542 A | 6/1974 | Cooper |
| 3,930,568 A | 1/1976 | Levey |
| 4,040,650 A | 8/1977 | Shotbolt |
| 4,139,466 A | 2/1979 | Rosaen |
| 4,154,101 A | 5/1979 | Buchanan et al. |
| 4,271,693 A | 6/1981 | Bute |
| 4,486,744 A | 12/1984 | Pratt et al. |
| 4,679,827 A | 7/1987 | Law |
| 4,787,251 A | 11/1988 | Kolodiski |
| 4,819,577 A | 4/1989 | Campau |
| 5,195,376 A | 3/1993 | Banks et al. |
| 5,291,182 A | 3/1994 | Wiseman |
| 5,343,753 A | 9/1994 | Boutin |
| 5,410,298 A | 4/1995 | Wiseman |
| 5,461,910 A | 10/1995 | Hodson |
| 5,589,643 A | 12/1996 | Pyle |
| 5,661,461 A | 8/1997 | Wiseman |
| 5,787,919 A | 8/1998 | Pyle |
| 5,798,697 A | 8/1998 | Wiseman |
| 5,981,877 A | 11/1999 | Sakata et al. |
| 6,477,896 B1 | 11/2002 | Nyberg |
| 6,506,974 B2 | 1/2003 | Nakata |
| 6,569,219 B1 | 5/2003 | Connor et al. |
| 6,725,731 B2 | 4/2004 | Wilklund et al. |
| 7,891,311 B2 | 2/2011 | Logan et al. |
| 8,003,014 B2 | 8/2011 | Breay et al. |
| 8,910,516 B2 | 12/2014 | Wiseman |
| 9,395,260 B2 | 7/2016 | Pyle |
| 10,191,077 B2 | 1/2019 | Wiseman |
| 10,571,482 B2 | 2/2020 | Wiseman |

(56) References Cited

U.S. PATENT DOCUMENTS

| | | | |
|---|---|---|---|
| 10,690,560 | B2 | 6/2020 | Wiseman |
| 10,942,197 | B2 | 3/2021 | Wiseman |
| 2009/0078116 | A1* | 3/2009 | Morgan ................. B01D 46/44 96/402 |
| 2009/0301213 | A1 | 12/2009 | Barmettler et al. |
| 2011/0094294 | A1 | 4/2011 | Townsend et al. |
| 2014/0260594 | A1 | 9/2014 | Wiseman |
| 2015/0059464 | A1 | 3/2015 | Wiseman |
| 2017/0067929 | A1 | 3/2017 | Wiseman |
| 2018/0164174 | A1 | 6/2018 | Wiseman |
| 2018/0292281 | A1 | 10/2018 | Bailly et al. |
| 2019/0154724 | A1 | 5/2019 | Wiseman |
| 2020/0158749 | A1 | 5/2020 | Wiseman |
| 2020/0278268 | A1 | 9/2020 | Wiseman |
| 2020/0379000 | A1* | 12/2020 | Wiseman ................. G01C 9/34 |
| 2020/0379001 | A1* | 12/2020 | Wiseman ............ G01P 13/0066 |
| 2021/0239729 | A1 | 8/2021 | Wiseman |

FOREIGN PATENT DOCUMENTS

| | | | | |
|---|---|---|---|---|
| WO | WO 98/52050 | A1 | 11/1998 | |
| WO | WO-0166955 | A2 * | 9/2001 | .......... F15B 15/2838 |
| WO | WO 2014/150755 | A1 | 9/2014 | |
| WO | WO 2015/179516 | A1 | 11/2015 | |
| WO | WO 2018/098339 | A1 | 5/2018 | |
| WO | WO 2020/243512 | A1 | 12/2020 | |
| WO | WO-2021081255 | A1 * | 4/2021 | ............. G01L 13/04 |

OTHER PUBLICATIONS

U.S. Appl. No. 16/878,555, filed May 19, 2020, Wiseman.
U.S. Appl. No. 16/222,944, filed Dec. 17, 2018, Wiseman.
U.S. Appl. No. 15/356,396, filed Nov. 18, 2016, Wiseman.
U.S. Appl. No. 15/821,440, filed Nov. 22, 2017, Wiseman.
U.S. Appl. No. 16/426,974, filed May 30, 2019, Wiseman.
U.S. Appl. No. 16/427,083, filed May 30, 2019, Wiseman.

[No Author Listed] Preqator; From the Wayback Machine. Screenshots taken Oct. 5, 2021 at https://web.archive.org/web/20131126025813/http://preqatool.se/Preqatool/Preqator.html of Wayback Machine Capture for http://preqatool.se/Preqatool/Preqator.html dated Nov. 26, 2013, 3 pages.

[No Author Listed] Preqator; From the Wayback Machine. Screenshots taken Oct. 5, 2021 at https://web.archive.org/web/20161026213515/http://preqatool.se/Preqatool/Preqator.html of Wayback Machine Capture for http://preqatool.se/Preqatool/Preqator.html dated Oct. 26, 2016, 3 pages.

[No Author Listed] Preqator; www.preqatool.se/Preqatool/Preqator.html. Screenshots taken Oct. 5, 2021, 3 pages.

[No Author Listed] Preqator—Original; www.preqatool.se/Preqatool/Preqator-Original.html. Screenshots taken Oct. 5, 2021, 3 pages.

[No Author Listed] Preqator-med hållare; www.preqatool.se/Preqatool/Preqator-med_hallare.html; Screenshots taken Oct. 5, 2021, 6 pages.

[No Author Listed] Preqator-med Hållare (alt. 1); http://preqatool.se/Preqatool/Preqator-_med_2_Hallare_(alt_1).html. Screenshots taken Oct. 5, 2021, 2 pages.

[No Author Listed] Preqator-med Hållare (alt. 2); http://preqatool.se/Preqatool/Preqator_-_med_2_Hallare_alt._2).html. Screenshots taken Oct. 5, 2021, 2 pages.

[No Author Listed] Bestsålling; http://preqatool.se/Preqatool/Bestallning.html. Screenshots taken Oct. 5, 2021, 2 pages.

[No Author Listed] Preqator; www.preqatool.se/Preqatool/Preqator.html. Webpage printed Oct. 9, 2020, 3 pages.

[No Author Listed] Preqator—Original; www.preqatool.se/Preqatool/Preqator-Original.html. Webpage printed Oct. 9, 2020, 3 pages.

[No Author Listed] Preqator-med hållare; www.preqatool.se/Preqatool/Preqator-med_hallare.html. Webpage printed Oct. 9, 2020, 4 pages.

[No Author Listed] Preqator-med Hållare (alt. 1); http://preqatool.se/Preqatool/Preqator-_med_2_Hallare_(alt_1).html. Webpage printed Oct. 9, 2020, 2 pages.

[No Author Listed] Preqator-med Hållare (alt. 2); http://preqatool.se/Preqatool/Preqator_-_med_2_Hallare_alt._2).html. Webpage printed Oct. 9, 2020, 2 pages.

* cited by examiner

DIRECTIONAL DIFFERENTIAL PRESSURE DETECTOR

FIELD

Disclosed embodiments relate to methods and apparatuses for detecting the presence of a directional differential pressure.

BACKGROUND

Various applications within hospitals, laboratories, pharmaceutical facilities, clean room facilities, etc., often require a particular direction of air flow or differential pressure to be maintained, such as between neighboring rooms, compartments, corridors, ducts, or other spaces. The pressure of a room relative to adjacent space(s) will determine the net direction of air flow through an opening into or out of the room.

For example, a hospital operating room may be kept under a positive pressure so that air flows out of the room, thereby preventing unfiltered or contaminated air from entering the room from adjacent spaces. This positive pressure is accomplished by supplying clean air to the operating room at a greater flow rate than the flow rate at which air is exhausted from the room by the room's ventilation system.

Or, if a hospital patient is infected with an airborne communicable pathogen, a patient isolation room may be kept under a negative pressure which is accomplished when the rate at which potentially contaminated air is exhausted from the room is greater than the rate at which air is supplied to the room from the room's ventilation system. Such a negative pressure arrangement, where the room is under a comparatively lower pressure than its immediate surroundings, prevents potentially contaminated air from exiting the room and escaping into surrounding space(s).

The net differential pressure between rooms will cause air to flow through an opening from one room to the other in the direction from a higher pressure to a lower pressure. The desired degree of differential pressure to be maintained between rooms, compartments, corridors, etc. will vary, depending on the application.

Accordingly, it is often desirable to closely monitor the general direction of potential or actual air flow between compartments and in some cases the particular magnitude of differential pressure causing the net air flow.

SUMMARY

In some embodiments, a device for indicating a presence of a directional differential pressure between a first space and a second space separated from the first space by a barrier, includes a rotatable base configured to be rotatably attached to the barrier, where the rotatable base includes a first conduit, and where the rotatable base rotates about a first axis transverse to the barrier. The device also includes a pivot arm coupled to the base and including a second conduit fluidly connected to the first conduit, where the pivot arm is configured to rotate about a second axis transverse to the first axis. The device also includes at least one movable element disposed within the second conduit and movable from a first, vertically lower region of the pivot arm to a second, vertically higher region of the pivot arm in response to the directional differential pressure between the first and second spaces being greater than a threshold differential pressure.

Advantages, novel features, and objects of the present disclosure will become apparent from the following detailed description of the present disclosure when considered in conjunction with the accompanying drawings, which are schematic and which are not intended to be drawn to scale. For purposes of clarity, not every component is labeled in every figure, nor is every component of each embodiment of the present disclosure shown where illustration is not necessary to allow those of ordinary skill in the art to understand the present disclosure.

BRIEF DESCRIPTION OF DRAWINGS

The accompanying drawings are not intended to be drawn to scale. In the drawings, each identical or nearly identical component that is illustrated in various figures is represented by a like numeral. Various embodiments of the present disclosure will now be described, by way of example, with reference to the accompanying drawings. The embodiments and drawings shown are not intended to narrowly define the present disclosure. In the drawings.

DETAILED DESCRIPTION

Figure 1:
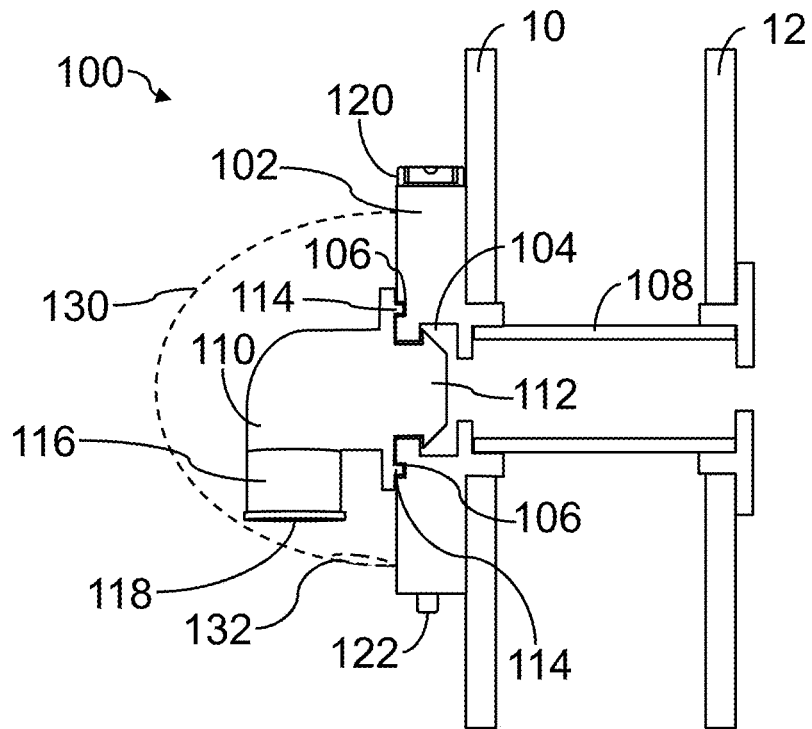
FIG. 1 is a side schematic of one embodiment of a device for indicating a directional differential pressure.

The present disclosure relates to devices and systems which provide an indication of potential or actual directional air flow and/or whether a particular degree of directional differential pressure exists between spaces (e.g., two neighboring rooms or a room and an adjacent corridor) separated by a barrier such as a wall. In some embodiments, the device includes a first component located on a first side of a barrier, and a second component located on a second side of the barrier such that each component is subject to the air pressure within its respective space. The overall device is adapted to react to pressure differences between the two spaces to provide an indication to a viewer of the device. In some embodiments, the device may include sensors which communicate a status to a remote device.

An air flow conduit may extend from one space to another space (e.g., room to hallway). According to some embodiments, a visual indicator such as a lightweight ball or other movable element moves within the conduit in response to differences in air pressures between the two spaces. For example, in some embodiments, the air pressure in a room may be higher than in an adjacent hallway, and if the difference surpasses a threshold pressure, the movable element may move toward an end of the conduit to indicate the pressure difference exceeding the threshold.

An air flow conduit does not necessarily require that the conduit be arranged to permit air to be transferred from one space to another. Instead, the pressures on opposite sides of a wall may communicate without air flow moving all the way through the air flow conduit. For example, a conduit may pass from a hallway to a room, and a piston may be positioned with within the conduit. If pressure in the room is sufficiently higher than in the hallway to surpass a threshold pressure differential, the piston may move toward the hallway and be visible within the conduit in the hallway. If the piston is sealed within the interior of the conduit, no room air escapes into the hallway space, though a small amount of air flows behind the piston within the conduit. In this manner, the air flow conduit may provide a fluidic connection between two spaces where some minor air flow occurs within the conduit, yet no air is transmitted from one space to the other.

As discussed further below, in other embodiments, the fluidic connection may allow air to be transmitted between two spaces until a ball seats against an end of a conduit. In still further embodiments, air flow from one space to another even when a ball (or other movable element) reaches the end of its travel path.

In some embodiments, a device for indicating a differential pressure between two spaces includes a one or more conduits in communication with the air in both spaces such that a movable element disposed in the conduit(s) can react to directional air flow caused by the differential pressure. As described further herein, the conduit(s) may extend through the wall, and adjustability of the incline of portions of the device may reside on both sides or a single side of the wall. The movable element (e.g., at least one ball) is disposed within a passageway of the conduit and moves freely back and forth along at least a portion of the length of the conduit. Restraints or end stops may be located at the ends or at other areas of the conduit to contain the ball within the conduit. The end stops may have openings that allow fluid (e.g., air, gas, liquid, water vapor, etc.) to flow through the passageway of the conduit from one end to an opposite end.

Systems are available for detecting whether a differential pressure between two spaces (e.g., between a clean room and an adjacent corridor) is above a threshold pressure difference. In some conventional systems, an inclined single conduit passes from one space to another through a wall, and a movable ball is placed in the conduit. On one side of the wall, for example the clean room side, the conduit has a lower region near the wall inside of the clean room and a higher region away from the wall in the corridor. Gravity pulls the ball toward the lower region of the conduit near the wall. As the pressure in the clean room is raised higher than the corridor pressure, air pressure and/or air flow apply forces against the ball. Once the pressure difference between the clean room and the corridor reaches a threshold level, the force of the air against the ball overcomes the force of gravity, and the ball moves to a higher region of the conduit. By observing the presence of the ball in the higher region, a user can quickly see that the pressure difference between the two spaces equals or exceeds the desired directional differential pressure threshold level. To change the threshold pressure difference set point, the angle of inclination of the conduit is adjusted such that the amount of gravitational force on the ball in the direction of the conduit is adjusted. That is, in some embodiments, a greater incline of the conduit in which the ball travels requires a greater pressure differential between the two rooms to overcome gravity and move the ball from a lower to a higher region.

Applicant has appreciated that it would be beneficial to provide a differential pressure monitoring system where the threshold value of directional differential pressure detection is adjustable from one side of the wall (or other barrier) and/or the system can account for the wall being out of plumb. In some embodiments, a monitoring system includes a pivot arm (or multiple pivot arms) on one side of the wall, and the pivot arm includes a set point indicator that reacts to an angle of inclination using gravity instead of a measured reference to another physical structure. The pivot arm may include a conduit which contains a movable element. In some embodiments, the arrangement of the pivot arm relative to the system permits pivoting of the pivot arm within a vertical plane.

By providing independent adjustment of the inclination of a conduit on one side of the wall, adjustments to the threshold directional differential pressure level can be made without having to access the device on both sides of the wall. Such an arrangement can be especially helpful when various protocols must be followed to enter a room being monitored.

The walls or other barriers on which the monitoring devices disclosed herein are being installed may be out of plumb, that is, not strictly vertical. Applicant has recognized that in such circumstances, pivot arms with angle indicators and/or threshold pressure level indicators may provide inaccurate information if the indicators are based on an assumption that the wall is plumb. Embodiments disclosed herein provide arrangements where accurate threshold directional differential pressure adjustment can be achieved even when the device is installed on an out-of-plumb wall. For example, in some embodiments, a conduit with the movable element therein is adjustable from one side of the wall, the conduit is pivotable within a vertical plane, and a set point indicator is tied to gravity rather than being based on markings on portions of the device that are static relative to the wall. A device that links a threshold set point(s) to marking(s) on the wall and/or marking(s) on portions of the device that do not move relative to the wall and of which set points were calibrated to a plumb wall, may cause errors when mounted to an out-of-plumb wall. Additionally, if a conduit does not pivot in a single plane, improper initial mounting of the device to a wall may cause inclination measurement errors, thereby causing inaccurate directional differential pressure measurement errors.

In some embodiments, one or more levels, such as bubble levels, may be used to confirm proper device installation and/or to provide an indication as to set points that are based on gravity/vertical inclination of a conduit relative to the horizontal plane. In some embodiments, the bubble level, or other measurement device, is used as a directional differential pressure set point indicator.

Certain embodiments disclosed herein provide a large range of available inclination angles. By providing a large angle range, a large range of threshold differential pressure set points are available. In some embodiments, the device is also arranged to permit pivoting such that the conduit containing the movable element (e.g., a ball), can be placed in different orientations relative to its associated wall (or other barrier), in some cases while maintaining its same inclination relative to a horizontal plane. In some embodiments, the conduit that is perpendicular to an axis of rotation may be rotated a full 360° about the axis of rotation. According to exemplary embodiments described herein, a conduit including a movable element such as a lightweight ball may be moved to an incline relative to a horizontal plane of greater than 10°, 20°, 30°, 45°, 60°, 75°, and 80° up to an incline of 90°. The incline may be positive or negative relative to the horizontal plane.

As mentioned above, various embodiments disclosed herein may include a directional differential pressure set point indicator associated with the conduit that contains the movable element. The set point indicator may be configured to correlate the incline of the conduit (with respect to the earth's gravitational pull) to a respective threshold directional differential pressure between the two adjacent spaces—the threshold directional pressure difference being the difference which is sufficient to cause the movable element to move from a lower region of the inclined conduit to a higher region. The directional differential pressure set point indicator may include, for example, a bubble vial, a rotating weighted pendulum pointer, or any other suitable component that responds to the incline of the conduit. The differential pressure set point indicator may be appropriately calibrated such that the markings on the directional differential pressure set point indicator correspond to threshold directional pressure differences that may exist between spaces separated by a wall or other barrier. Accordingly, the directional differential pressure set point indicator may provide an indication of what angle of conduit inclination corresponds to the directional threshold differential pressure set point between the two separated spaces.

In some embodiments, when installed, a conduit extends from one side of a barrier (e.g., a wall) to the other side such that opposite ends of the conduit extend outwardly into neighboring spaces that are separated by the wall. In some embodiments, only one end of the conduit extends outwardly from the wall. Fluid (such as air) is permitted to flow between the spaces through the conduit in some embodiments.

The pressure difference required to move the ball from a home position (the ball's position when there is no pressure difference between the rooms) can vary based at least on the physical features of the conduit (e.g., passageway diameter, straightness/curvature, surface finish), physical features of the ball (e.g., diameter, weight, surface finish), degree of incline of the conduit, fluid properties of the media between compartments, and the orifice sizes at the end stops. In many cases, each of the above parameters is known to a sufficient degree such that threshold directional pressure differences can be linked to the angle of inclination. In some embodiments, balls of different weights may be used to adjust the threshold pressure differences. In such embodiments, the conduit angle may or may not be adjustable.

As an example, for a hospital isolation room occupied by a patient with an infectious disease that is capable of airborne transmission, it may be desirable to keep the room at a negative differential pressure relative to one or more adjacent rooms, so as to substantially prevent airborne transmission of the disease to an adjacent room. In such an arrangement, the room's ventilation system exhausts more air than is supplied within it to an extent that the negative pressure is of a greater magnitude than any adjacent space. Thus, the conduit may be installed such that the end of the conduit that extends toward the isolation room (e.g., extends inside the isolation room) is at a higher position than the opposite end of the conduit that extends toward a space immediately exterior to the isolation room (e.g., into a corridor, a compartment, duct, or another room).

When the net directional differential pressure between the isolation room and the outside space is zero (e.g., a door between the room and the outside space is opened), or the pressure in the isolation room is greater than the adjacent spaces, the ball will fall to the lower end of the conduit such that an observer inside the isolation room would not be able to view the ball; and where the opposite end of the conduit is located within the neighboring room, it follows that an observer outside the isolation room in the neighboring room would be able to see the ball. Or, if the conduit is substantially located within the isolation room (e.g., in a pivot arm or turret-type configuration), the ball may fall to the lower end of the conduit yet remain within the isolation room (e.g., exposed or covered from view), or within the wall cavity between rooms. When the appropriate degree of negative pressure is applied to the room, the ball moves upwardly within the conduit to the vertically higher end. That is, the difference between the pressure of the isolation room and the pressure in the outside space on the opposite side of the wall causes forces on the ball that are sufficient to move the ball upwardly where it can be conspicuously viewed from inside the isolation room—thereby indicating that at least the appropriate direction of air flow through an opening between the rooms and degree of negative pressure is applied to the isolation room. It should be noted that Applicant has appreciated that the communicating conduit can not only be through one wall or barrier and sense the pressure conditions on each side, but, in some embodiments, the conduit may leave a room and pass through adjacent spaces and open up to a space not immediately adjacent to the initial room.

In the case of a hospital operating room that is required to exhibit a positive pressure, so as to substantially prevent potentially contaminated air from flowing into the room from a surrounding space, the conduit may be installed such that the end of the conduit that extends toward the operating room (e.g., extends inside the operating room) is at a lower position than the opposite end of the conduit that extends toward the surrounding space exterior to the room. Thus, when a suitable amount of positive pressure is applied to the operating room, there is sufficient directional differential pressure to move the ball upwardly within the conduit to the conduit end toward the surrounding space.

When installed, the conduit may be set at an appropriate angle of inclination that corresponds to the desired threshold differential pressure set point. In some embodiments, the desired differential pressure set point may be between 0.001 inch of $H_2O$ and 10 inches of $H_2O$ (e.g., between 0.001 inch of $H_2O$ and 1 inch of $H_2O$, between 0.001 inch of $H_2O$ and 5 inch of $H_2O$, between 0.005 inches of $H_2O$ and 0.5 inches of $H_2O$, between 0.1 inch of $H_2O$ and 0.5 inches of $H_2O$, between 0.01 inch of $H_2O$ and 0.1 inches of $H_2O$, between 0.01 inch of $H_2O$ and 0.05 inches of $H_2O$, between 0.01 inch of $H_2O$ and 0.03 inches of $H_2O$, between 0.005 inches of $H_2O$ and 0.1 inch of $H_2O$, between 0.001 inch of $H_2O$ and 0.005 inches of $H_2O$, between 0.001 inch of $H_2O$ and 0.003 inches of $H_2O$, etc.), as measured by a standard water column manometer. It will be appreciated that devices of the present disclosure may provide an indication of other differential pressures between adjacent spaces outside of these ranges.

As discussed above, a differential pressure set point indicator may be secured to the conduit so as to provide a correlation between the angle of inclination of the conduit, the physical dimensions and configurations of the components of the system, and the threshold differential pressure between the spaces.

As an example, if the desired differential pressure threshold set point is 0.02 inches of $H_2O$, then, given the components of the system (e.g., ball, conduit, orifices), the conduit may be angled in such a manner where the lower end of the conduit is toward the higher pressure compartment and the higher end of the conduit is toward the lower pressure compartment, that the force of gravity on the ball will be overcome by the pressure and any air flow forces on the ball in the direction opposite gravity from the low to the high end of the conduit, created by at least 0.02 inches of $H_2O$ pressure difference between the compartments.

Applicant has recognized that the external calibration methods used to establish an accurate relationship between the angle of tilt (i.e., inclination) of the conduit and the threshold differential pressure can be time-consuming and expensive. For example, once the device is installed, such external calibration methods may include the use of a manometer to measure the pressure differential between the adjacent spaces to which the device/conduit is coupled, and noting the angle of tilt of the conduit at which the ball moves from one end to an opposite end (e.g., falling from the higher end to the lower end, or moving from the lower end to the higher end). To continue the calibration process, the pressure difference between the adjacent spaces is adjusted and measured, and the corresponding angle of tilt of the conduit at which the ball moves from one end to the other is further noted. These steps of calibration are repeated for multiple pressure differentials and corresponding angles of tilt for the device. As mentioned above, such steps of pressure measurement and calibration may be expensive and time-consuming.

One possible method to avoid re-calibrating a device each time it is installed to a wall involves including markings on the device that correlate the conduit's angle of inclination directly to the differential pressure between spaces that causes the ball to move from one end to the other. Applicant has recognized that such a method may rely on the orientation of the wall to which the device is mounted or resides against, which might not be aligned with the direction of gravity (i.e., the wall might not be plumb). That is, providing markings that indicate particular threshold differential pressure values thereon may lead to inaccurate results unless the wall is vertically aligned with the direction of gravity (i.e., the wall is plumb) and the indicator is properly installed to the wall.

Applicant has appreciated that it may be advantageous to employ an indicator that is directly calibrated to gravity. For example, an inclinometer that responds to the force of gravity (e.g., bubble inclinometer, pendulum inclinometer, etc.) may be mounted to an appropriate portion of the differential pressure detection device so that an accurate determination can be made as to the actual degree of tilt of the conduit required to reach an equilibrium between the force of gravity and the forces on the ball, arising from directional differential pressure across the ball resulting from the directional differential pressure between the adjacent spaces. Accordingly, the accuracy of such a device is not reliant on whether the wall to which it is mounted or otherwise resides against is aligned with the direction of gravity (i.e., plumb).

Further, Applicant has recognized that it may be advantageous to be able to adjust the angle of inclination of the conduit containing the ball from only one side of the wall while maintaining the conduit in a single plane, for example, a vertical plane. When pivoting the conduit in only a vertical plane, various inclinometers, such as a weighted ball, or a weighted pendulum, that are positioned at a given roll orientation relative to a longitudinal axis of the conduit (e.g. on the top of the conduit) will remain positioned at the same roll orientation relative to the conduit throughout pivoting of the conduit. In a device where adjusting the vertical inclination results in a lateral inclination as well, the weighted pendulum may have a roll component when the conduit is moved, which may re-orient the bubble vial to an orientation that makes reading difficult, or in some cases, prevents proper measurement. For example, if a conduit rotates only within a conical space (rather than a planar space), any change in vertical inclination results in a rolling of the conduit about its own axis, which would change the roll and yaw orientation of the inclinometer, such as the weighted pendulum. As with some embodiments disclosed herein, when pivoting in a vertical plane is possible without requiring other reorientation, the weighted pendulum would only change its pitch orientation.

In further embodiments of the present disclosure, a device for detecting whether a threshold directional differential pressure is present between two spaces separated by a wall may include multiple conduits that provide a continuous passageway through which air may flow between spaces on opposing sides of the wall. In some cases, such arrangements may allow for the angle of incline of the conduit that contains the movable element to be adjusted from one side of the wall, rather than having to make adjustments to the angle of the incline of the conduit while coordinating adjustments from both sides of the wall. Such an arrangement is particularly useful for monitoring the differential pressure between two rooms that have one or more rooms/spaces between them which the conduit traverses.

For example, a conduit having at least one movable element (e.g., lightweight ball) located therein may be arranged to extend along, be parallel to, or be rigidly coupled to an axis that rotates about a pivot point, where rotation of the conduit about the pivot point is accessible from one side of the wall. In some embodiments, the pivot point is positioned on one side of the wall, or is offset a suitable distance from one side of the wall. For example, the pivot point may be located within a space outside of the wall (e.g., spaced away from an exterior surface of the wall) or within a space between exterior surfaces of the wall. In some embodiments, the conduit may rotate without a set pivot point. For example, the conduit may be configured to translate and rotate at the same time.

In some embodiments, a device for indicating a threshold directional differential pressure may include a first pivot arm or rotatable base coupled to a barrier which rotates about a first axis transverse to the barrier. The device may also include a second pivot arm rotatably coupled to the first pivot arm or rotatable base and configured to rotate about a second axis transverse to the first axis. In some embodiments, the first axis may be perpendicular to the wall and the second axis may be perpendicular to the first axis. According to this embodiments, rotatable base may be rotatable 360° about the first axis, and the pivot arm may be rotatable at least 180° about the second axis. Accordingly, such an arrangement may allow the pivot arm to be inclined at any angle within a semi-spherical range of motion. The rotatable base and pivot arm arrangement may also reduce the amount of space occupied by the device while allowing the device to be adjusted to compensate for out of plumb barriers (e.g., non-vertical walls) so that an accurate threshold differential pressure indication is produced by the device.

It should be noted that an axis or direction which is transverse to another direction does not need to intersect the axis to which it is transverse in three-dimensional space. That is, any non-parallel axes are transverse to one another even if they do not intersect in three-dimensional space. Of course, transverse axes will intersect when projected onto a two-dimensional plane.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a side schematic view of one embodiment of a device 100 for indicating a threshold directional differential pressure. The embodiment of FIG. 1 includes a pivot arm 110 rotatable about an axis transverse to a barrier 10, 12 to adjust an angle of inclination of a conduit formed in the pivot arm. As shown in FIG. 1, the device includes a base plate 102 which is secured to a first side 10 of a barrier defining a first space. The base plate includes a receptacle 104 configured to receive a flanged end 112 of the pivot arm. The flanges engage the receptacle to rotatably secure the pivot arm to the base plate. The base plate also includes circular grooves 106 which receive guides 114 of the pivot arm, to further constrain the pivot arm movement to rotation about a single axis. As shown in FIG. 1, the pivot arm includes a 90° bend, so that an inclination of an end of the pivot arm may be adjusted via rotation of the pivot arm about its axis. The base plate fluidly connects the pivot arm to a wall conduit 108 which connects to a second space defined by a second side 12 of the barrier. Accordingly, the first space and second space are connected via wall conduit 108 and pivot arm 110.

According to the embodiment of FIG. 1, the pivot arm 110 includes a first conduit through which air may pass as a result of a directional differential pressure between the first space and the second space on opposite sides of the barrier 10, 12. The first conduit is configured to contain a movable element such as a lightweight ball which moves based on the angle of inclination of the pivot arm and the differential pressure between the two spaces. As shown in FIG. 1, the pivot arm includes a window 116 which allows the movable element to be seen inside of the pivot arm when the movable element is aligned with the window. The pivot arm also includes an end stop 118 which is configured to retain the movable element inside of the pivot arm.

As shown in FIG. 1, the device includes a first level 120 and a second level 122 which are disposed on the base plate 102 and are used to assist in mounting the rotatable base to the first side 10 of the barrier to ensure the axis of rotation of the pivot arm extends in an appropriate direction. The first level 120 is arranged in a direction transverse to the first side 10 of the barrier and is configured to indicate when the axis of the rotation of the pivot arm is aligned with a horizontal plane. The first level also indicates whether the base plate 102 is aligned with a vertical plane. When the base plate is secured to the barrier, the first level also may indicate whether the barrier is out of plumb and not vertical. As discussed above, if the axis of rotation of the pivot arm is not aligned with a direction assumed during manufacturing, the threshold pressure to move a movable element may be altered. Accordingly, an installer may verify that the assumptions regarding threshold pressure are applicable by ensuring the first level 120 indicates alignment of the axis of rotation of the pivot arm with a horizontal plane. For example, if the wall is not plumb, the base plate 102 may be shimmed or otherwise adjusted until the first level 120 shows that the device is level. In one embodiment, the first level 120 may use an air bubble in liquid to indicate whether the device is oriented correctly. The second level 122 is configured to indicate vertical orientation of the base plate 102 on the barrier and is therefore oriented perpendicularly to the first level 120. That is, the second level indicates when the base plate is in a correct roll orientation relative to the axis of rotation of the pivot arm. Such an arrangement may be beneficial when the base plate includes markings which may indicate the value of a differential pressure or otherwise provide information to a user of the device.

As shown in FIG. 1, the device 100 also includes a transparent shield 130 which may be used to protect the pivot arm from unintentional contact while allowing the pivot arm to remain visible so that a differential pressure may be indicated. The shield includes an orifice 132 which allows air to pass from the first side 10 of the barrier to the pivot arm through end stop 118. Accordingly, the shield does not interfere with the differential pressure based movement of a movable element in the pivot arm. It should be noted that the shield may be omitted from the device 100 without a corresponding loss in functionality of the pivot arm and/or movable element disposed therein.

Figure 2:
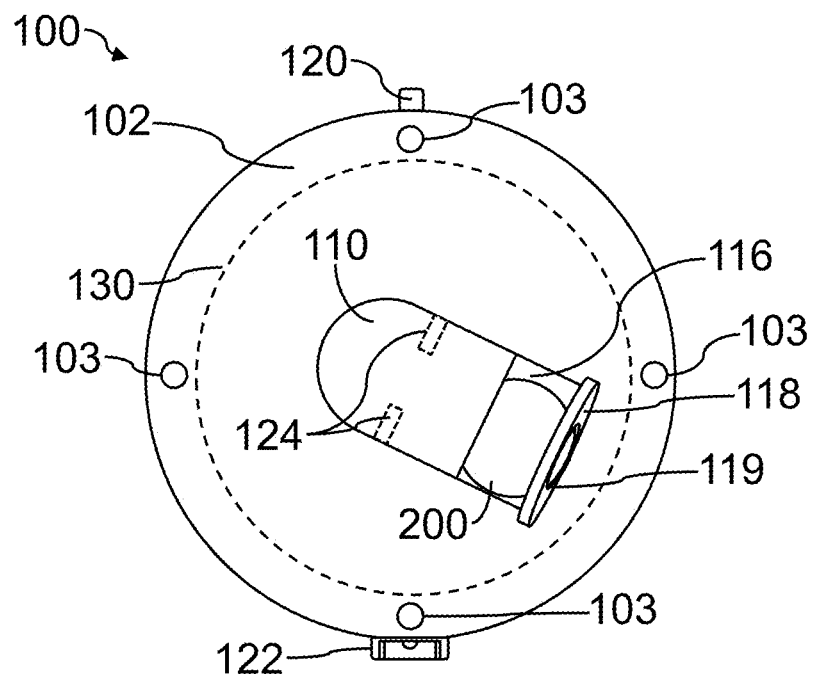
FIG. 2 is a front schematic of the device of FIG. 1.

FIG. 2 depicts the device 100 from a front view, with the view aligned with an axis of rotation of the pivot arm 110. As noted previously, the pivot arm 110 is configured to rotate about an axis transverse (e.g., perpendicular) to a barrier. The pivot arm includes a 90° bend which allows the inclination of the end of the pivot arm to be adjusted relative to a horizontal plane. As shown in FIG. 2, the pivot arm is rotated so that pivot arm end is inclined at a negative angle relative to a horizontal plane. Such an arrangement may be beneficial in a space which is to have a positive pressure. A ball (e.g., a movable element) 200 is disposed in the pivot arm and is visible through the window 116. End stop 118 retains the ball inside the pivot arm. According to the depicted embodiment, the end stop 118 includes an orifice 119 which is sized and shaped to receive an end of the ball 200. The position of the ball against the end stop and orifice may form a fluid (i.e., air) barrier between first and second spaces, which may be desirable to inhibit air transfer between spaces. As shown in FIG. 2, the pivot arm also includes internal stops 124. The internal stops are configured to keep the ball 200 within the pivot arm, particularly in the end of the pivot arm where inclination may be adjusted. The internal stops are positioned so that when a differential pressure or gravity moves the ball 200 into the opaque portion of the conduit, the ball is stopped in a portion of the conduit where the ball is out of sight of a user. As noted previously, the visibility of the ball may indicate the presence of a differential pressure greater than a threshold pressure. In the state shown in FIG. 2, and device 100 located with pivot arm 110 in a first space, a positive differential pressure in the first space may move the ball 200 toward the internal stops 124 when the pressure exceeds a threshold based at least partly on the inclination of the pivot arm end. In this case, the non-visibility of the ball 200 would indicate an effective positive pressure in the first space, and accordingly an effective negative pressure in the second space. Alternatively, the ball may be used to indicate a negative pressure in the first space if the pivot arm is located in the first space and the pivot arm is rotated so that the pivot arm end is inclined at a positive angle relative to a horizontal plane. In such a case, the visibility of the ball positioned against the end stop 118 would indicate a negative differential pressure in the first space greater than a threshold differential pressure relative to the second space. According to the embodiment of FIGS. 1-2, the pivot arm 110 may pivot ±90° (i.e., 180°) to adjust the threshold air pressure differential monitoring calibration.

As shown in FIG. 2, the base plate 102 may be configured to receive a plurality of fasteners 103 which may be used to secure the base plate to a barrier. The fasteners employed may be screws, nails, adhesives and/or any other suitable fastener, as the present disclosure is not so limited.

Figure 3:
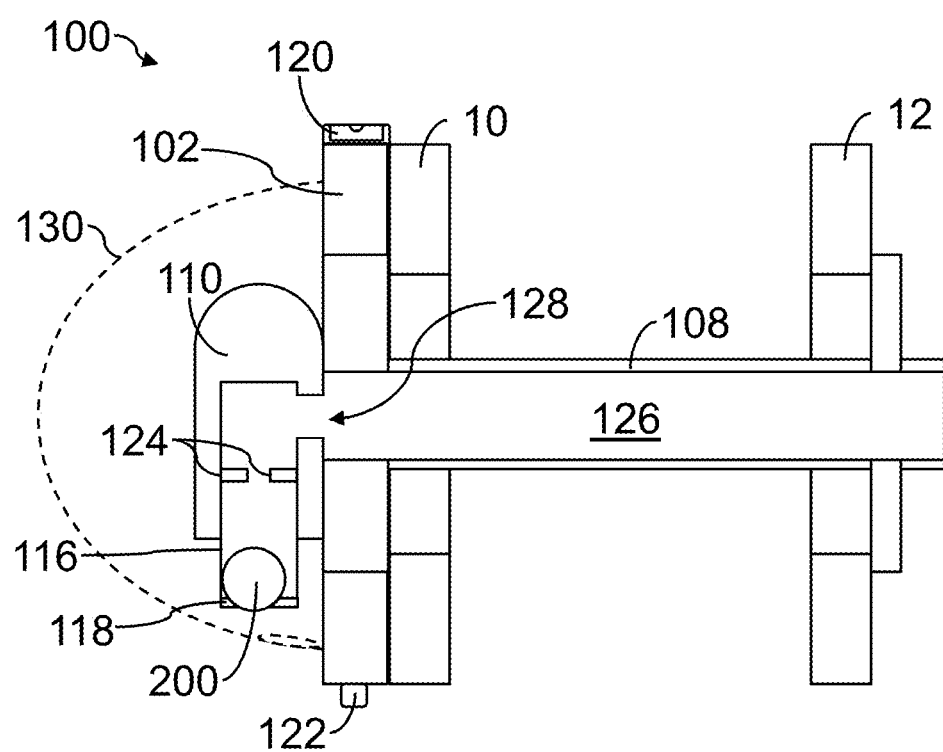
FIG. 3 is a cross-sectional side schematic of the device of FIG. 1.

FIG. 3 is a cross-sectional side schematic view of the device 100 of FIG. 1 showing a continuous fluid channel 126 formed through both sides 10, 12 of the barrier and the pivot arm 110. As noted previously, the device wall conduit 108 fluidly connects a first space to a second space, such that air pressure may be transmitted and measured between the first space and the second space via the device 100. As shown in FIG. 3, a transition region 128 exists where the wall conduit 108 is first surrounded by the pivot arm 110 when traveling in a direction toward the pivot arm. In some embodiments, the transition region is where a cylindrical recess surrounds a cylindrical insert. In the embodiment shown in FIG. 3, the wall conduit 108 may extend slightly into a cylindrical recess (not shown) in pivot arm 110 where the outer surface of wall conduit 108 engages with an inner surface of the cylindrical recess. This engagement region would be the transition region in such an embodiment. In some cases, such as in the embodiment of FIG. 3, the pivot arm is arranged such that pivoting the pivot arm within a vertical plane (i.e., rotating the pivot arm about a horizontal axis) does not change a location of the transition region relative to the first conduit. In some embodiments, such as the embodiment of FIG. 3, pivoting the pivot arm does not alter the flow passageway from the conduit to the pivoting arm. For example, the general path that fluid flow would follow to arrive at the pivot arm would not be altered when the pivot arm is pivoted. In this manner, significant changes to air flow resistance in the passageway may be limited, yielding a more accurate reading device.

Figure 4:
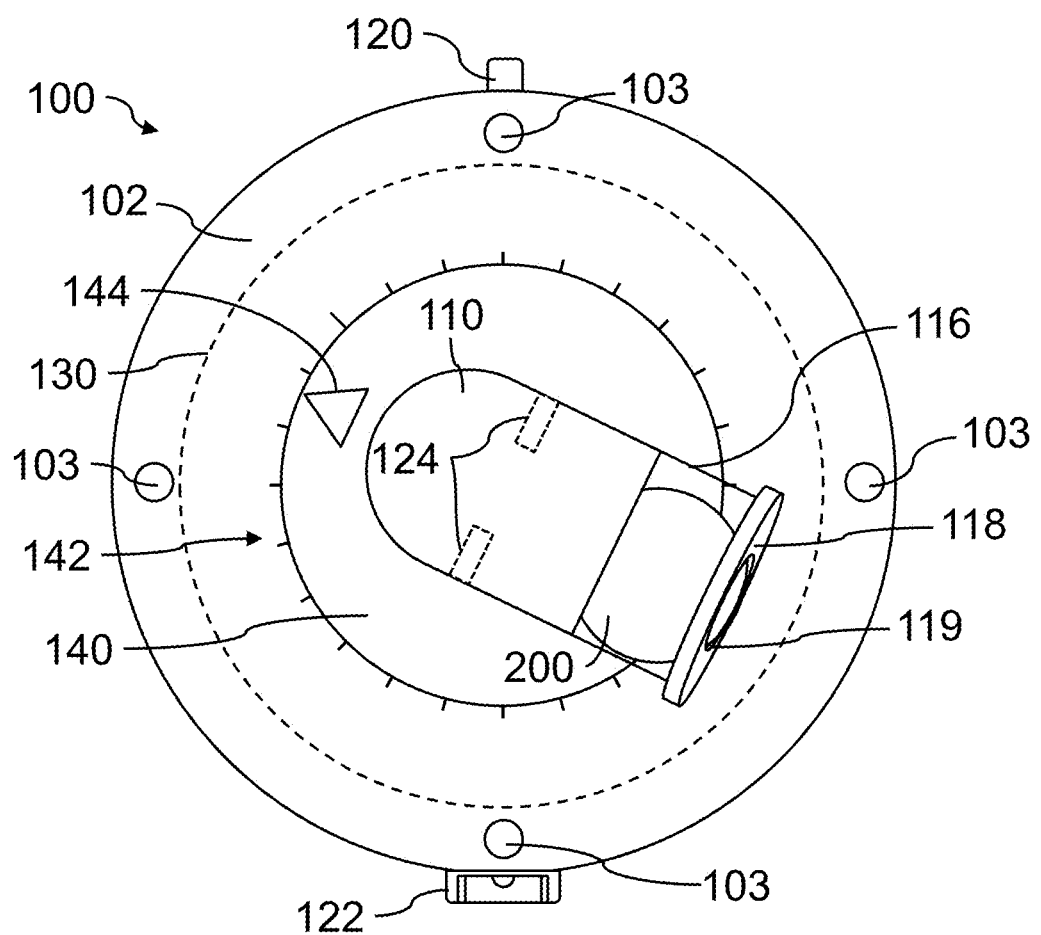
FIG. 4 is a front schematic of another embodiment of a device for indicating a directional differential pressure.

FIG. 4 is a front schematic view of another embodiment of a device 100 for indicating a directional differential pressure. The embodiment of FIG. 4 is similar to that of FIGS. 1-2, except that the embodiment of FIG. 4 is configured to indicate a threshold differential pressure threshold set point based on the angle of inclination of the pivot arm relative to a horizontal plane. That is, in the depicted embodiment, the pivot arm 110 includes a rotatable base plate 140 which rotates concurrently with the pivot arm. The rotatable base plate includes an arrow 144 which is aligned with an end of the pivot arm which is inclined as the pivot arm rotates. Pluralities of markings are disposed on a base plate 102 which is fixed to the wall. The markings are disposed around a circumference of the rotatable base in a predetermined interval and denote various angles of the pivot arm. The markings may correspond to threshold differential pressure values from a separate chart or may list threshold differential pressure values. Thus, during installation of the device, the pivot arm may be rotated to a position so that an appropriate differential pressure threshold may be set for a given space. As discussed previously, the accuracy of the markings 142 may be based on the alignment of the pivot arm axis of rotational with a horizontal plane, which may be indicated with a first level 120. Additionally, the accuracy may also be partly determined by the roll orientation of the rotatable base 102, the correct orientation of which is indicated by a second level 122.

Figure 5:
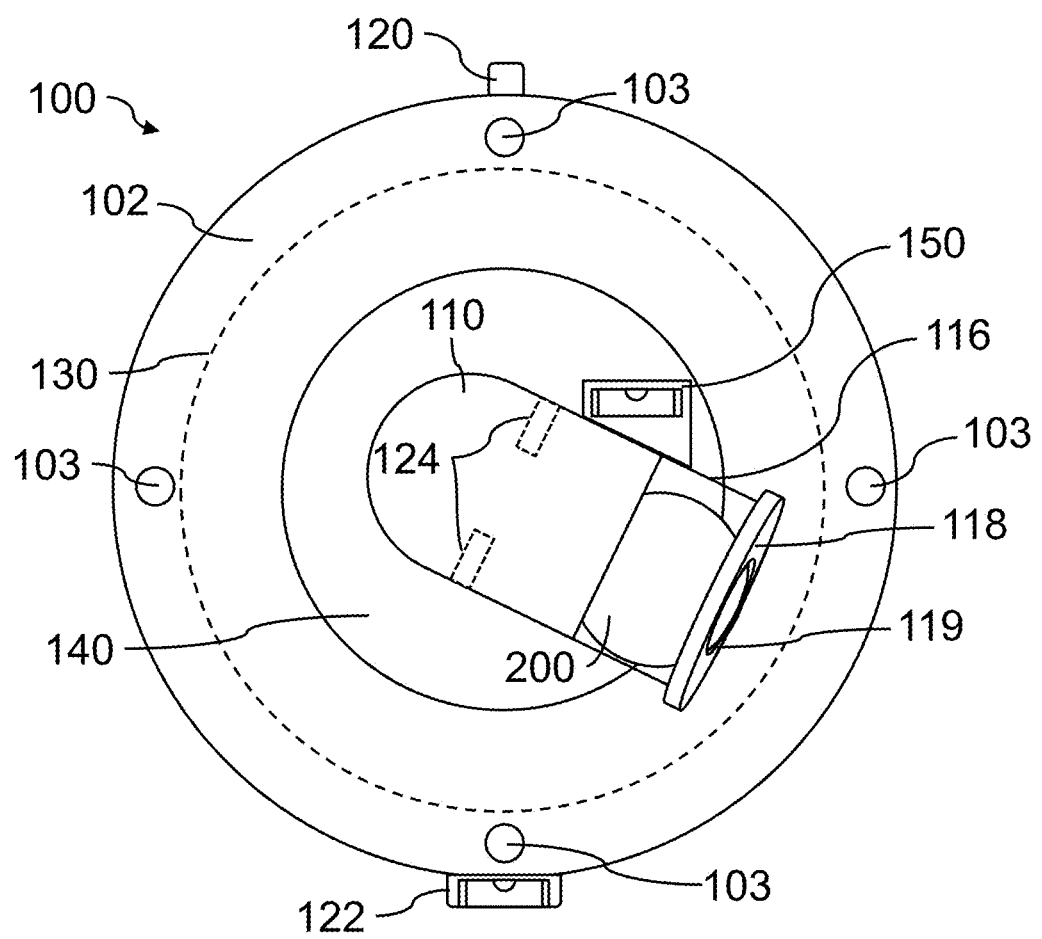
FIG. 5 is a front schematic of another embodiment of a device for indicating a directional differential pressure.

FIG. 5 is a front schematic of another embodiment of a device 100 for indicating a directional differential pressure. The device of FIG. 5 is similar to that of FIGS. 1-2, and includes a pivot arm 110 configured to rotate about an axis transverse (e.g., perpendicular) to a barrier on which a base plate 102 is secured. A rotatable base 140 is secured to the pivot arm 110 and is configured to rotate concurrently with the pivot arm. A movable element 200 moves inside the pivot arm between end stop 118 and internal stops 124 depending on the presence of a differential pressure between two spaces or lack thereof. In contrast to the embodiments of FIGS. 1-2, the pivot arm includes a differential pressure set point indicator 150. According to the embodiment of FIG. 5, the differential pressure set point indicator is configured to indicate when the pivot arm 110 is inclined at a suitable inclination to correspond to a particular differential pressure threshold. That is, the differential pressure set point indicator includes a bubble level which denotes alignment of the pivot arm at a particular inclination and differential pressure threshold. The differential pressure set point indicator may be used to indicate either a positive or negative pressure threshold, depending on the orientation of the differential pressure set point indicator on the pivot arm. In some embodiments, the differential pressure set point indicator may be integrally formed with the pivot arm, while in other embodiments the differential pressure set point indicator may be replaceable or swappable to allow a user to choose from among a set of differential pressure thresholds.

The embodiments described below with reference to FIGS. 6-10 are differential pressure set point indicators which may be used with devices of exemplary embodiments described herein. That is, the differential pressure set point indicators may be used with any conduit (such as a pivot arm) which contains a movable element that is responsive to a differential pressure between two spaces. Differential pressure set point indicators may be used alone or in combination with other indicators, as the present disclosure is not so limited. Additionally, differential pressure set point indicators may be integrally formed with device of exemplary embodiments described herein, or may be attached separately in a permanent, semi-permanent, or releasable manner, as the present disclosure is not so limited.

Figure 6:
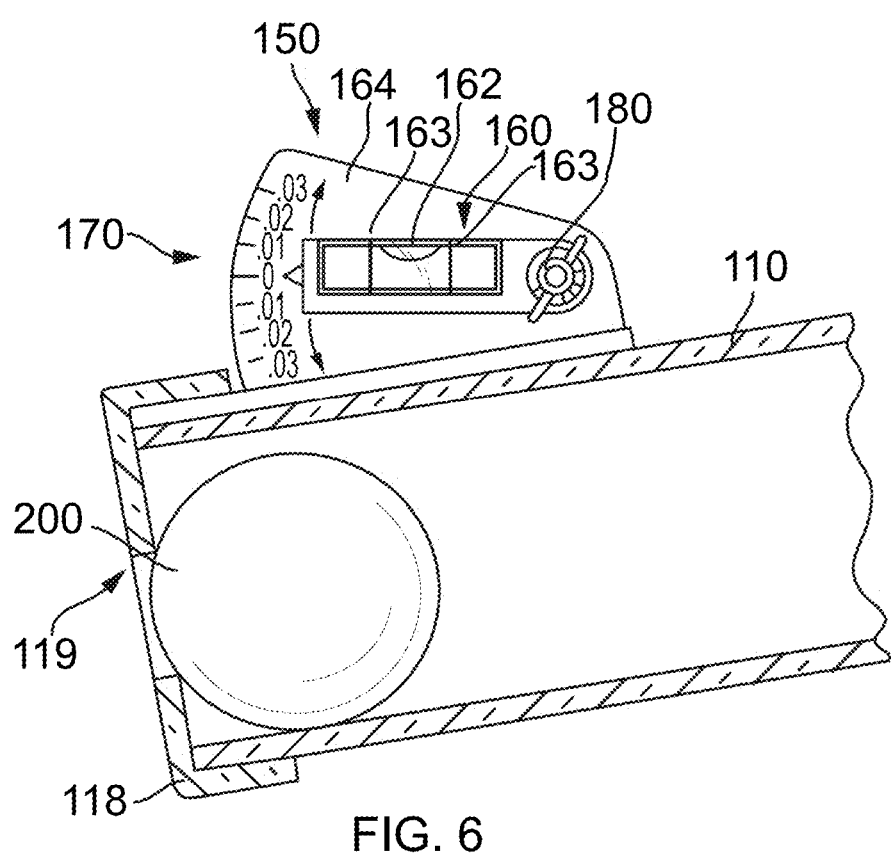
FIG. 6 is a partial cross-sectional view of one embodiment of a differential pressure set point indicator.

FIG. 6 is a partial cross-sectional view of one embodiment of a differential pressure set point indicator 150 which is attached to a first conduit (e.g., a pivot arm) 110 and indicated the a threshold differential pressure which moves a movable element (e.g., a ball) 200 in the first conduit. Like other bubble differential pressure set point indicators, this differential pressure set point indicator 150 includes a vial 160 with a liquid and associated bubble pointer 162. The vial may be appropriately rotated about a pivot 180 with a fastener (e.g., wing nut), capable of loosening and securing rotation of the vial about the pivot so that the vial points to markings 170 that indicate corresponding threshold differential pressure values that may be set between separate spaces which, in turn, correspond to the appropriate angle of inclination of the differential pressure set point indicator 150 and, hence, the angle of the conduit 110 itself when the bubble pointer 162 is between the boundary lines 163. For instance, when it is desired for the device to be installed so as to extend through a wall and between separated spaces to indicate to an observer that a directional differential pressure of at least 0.02 inches of $H_2O$ is present, then, in the embodiment of FIG. 6, the angular position of the vial on the pivot 180 is adjusted so that the vial 160 points to the particular marking that references a pressure of 0.02 inches of $H_2O$ in the desired direction of potential air flow. Since the differential pressure set point indicator can sense both directions of the conduit incline, there may be similar symmetric markings for the desired threshold differential pressure set point in each direction. Accordingly, the device is appropriately installed such that the pointer of the vial 160 aligns with the appropriate directional differential pressure markings resulting in the conduit having an angle of inclination that allows the bubble pointer 162 to remain steady at the middle of the vial between the boundary lines 163. Hence, after appropriate installation, a directional differential pressure in the direction from a first space to a second space of 0.02 inches of $H_2O$ or greater will generate enough pressure differential and potential air flow forces on the movable element 200 to cause the ball to move from a lower end to a higher end.

If it is further desired that the device provide indication to an observer of whether a particular directional different differential pressure between spaces is present, then the pivot can be appropriately adjusted so that the vial points to the appropriate one of the two similar markings which correspond to the desired pressure, of which the appropriate mark of the two is determined by adjusting the conduit incline with the low end in the desired higher pressure space and the high end in the desired lower pressure space so that the bubble 162 reaches an equilibrium state in the middle of the vial e.g., between boundary lines 163. For example, a change in the desired pressure difference between the spaces from 0.02 inches of $H_2O$ to 0.03 inches of $H_2O$ with the same desired direction of potential air flow may involve a simple adjustment of the wing nut so that the vial 160 points to the closer marking that references 0.03 inches of $H_2O$, which would involve positioning the conduit at a steeper inclination angle (e.g., by rotating a pivot arm about an axis traverse to a barrier) to put the bubble 162 in between the boundary lines 163. Once the differential pressure set point indicator is appropriately adjusted and the angle of inclination of the conduit is set within the wall such that the bubble pointer 162 remains steady at the middle of the vial, the device is ready to provide an accurate indication of whether the desired direction of potential air flow and directional threshold differential pressure between spaces is actually present.

Figure 7:
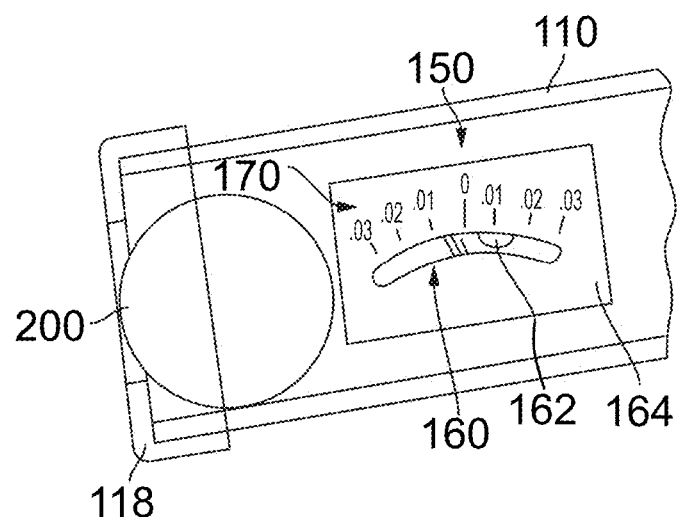
FIG. 7 is a partial cross-sectional view of another embodiment of a differential pressure set point indicator.

FIG. 7 is a partial cross-sectional view of another embodiment of a differential pressure set point indicator 150 attached to a conduit 110 via an appropriate base plate 164. The differential pressure set point indicator includes a vial 160 that contains liquid and an associated bubble pointer 162. Due to the geometry of the vial and gravity acting on the liquid within the vial, the bubble moves to the highest possible point within the vial. Here, the vial 160 exhibits a geometry (e.g., curvature) that allows for the bubble to provide differential pressure set point information at multiple regions along the vial. For instance, when the conduit is perfectly level, the bubble moves toward a position where the vial and base plate correlate to being level. However, when the conduit is inclined at an angle, the position of the bubble relative to the vial will change so as to provide an indication that the conduit is set at a different angle of incline.

As shown in FIG. 7, markings 170 are provided adjacent to the vial so that appropriate differential pressure set point information is provided to an observer (e.g., someone who is adjusting the tilt of the conduit) when the conduit is angled in a manner that brings the bubble into steady alignment near particular marking(s). Because the differential pressure set point indicator can sense both directions of the conduit incline (i.e., positive or negative incline relative to a horizontal plane), there are two similar symmetric markings for each desired threshold differential pressure set point. Here, the markings 170 refer to the threshold directional differential pressure between spaces required to generate enough differential pressure and potential air flow forces to move the ball from a lower end of the conduit 110 to a higher end. That is, the conduit 110 may be tilted so that the bubble pointer 162 aligns with the appropriate one of the two similar markings which corresponds to the desired pressure. The appropriate marking of the two is determined by adjusting the conduit incline with the low end in the desired higher pressure space or a high end in the desired lower pressure space so that the bubble 162 remains in steady alignment and points to the desired marking that indicates a particular value of the directional pressure differential. When the conduit is installed at the angle that corresponds to that particular value of pressure differential, movement of the ball 200 to a higher region of the conduit indicates that the directional differential pressure indicated by the bubble 162 exists (or is exceeded) between the separate spaces.

Figure 8:
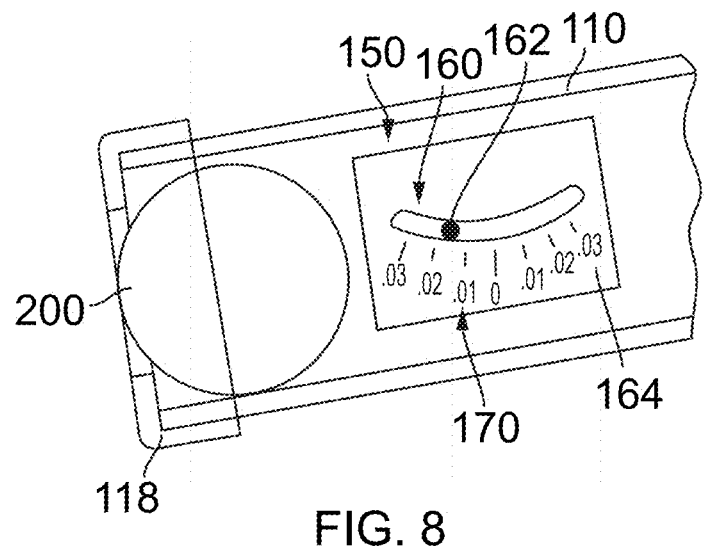
FIG. 8 is a partial cross-sectional view of another embodiment of a differential pressure set point indicator.

FIG. 8 is a partial cross-sectional view of another embodiment of a differential pressure set point indicator 150 which includes a weighted ball-type differential pressure set point indicator. The differential pressure set point indicator 150 includes a vial 160 with a weighted ball pointer 162. The vial 160 is filled with a fluid (e.g., gas, liquid) and the ball pointer moves to the lowest point within the vial by force of gravity (i.e., weight). The vial 160 may exhibit a curvature that permits the ball to provide information regarding the angle of incline of a conduit 110 when the ball 162 remains in steady alignment at various regions along the vial. For instance, when the conduit is perfectly level, the ball pointer 162 moves toward the middle of the vial. Though, when the conduit is tilted at an angle, the ball pointer 162 may still remain in steady alignment with a region of the vial that is offset from the middle of the vial.

As shown in FIG. 8, markings 170 are provided adjacent to the vial 160 so that appropriate information can be provided when the conduit is tilted such that the ball pointer 162 aligns with a particular one of the markings. The markings 170 refer to the threshold directional differential pressure set point between spaces required to create a sufficient degree differential pressure and potential air flow forces that moves the ball 200 within the passageway of the conduit 110 from a lower end of the conduit to a higher end. That is, the conduit 110 may be inclined so that the ball pointer 162 aligns with markings that indicate a particular value of directional pressure differential. When the conduit is installed at the angle that corresponds to that particular value of directional pressure differential, movement of the ball 200 within the passageway from the lower end of the conduit 110 to the higher end of the conduit indicates that the directional differential pressure indicated by the ball pointer 162 actually exists (or is exceeded) between the spaces. Based on how the vial of a ball-type differential pressure set point indicator is shaped, the markings 170 which relate the angle of incline of the conduit to the threshold pressure differential between spaces are calibrated and appropriately positioned.

The ball-type differential pressure set point indicator of FIG. 8 provides for different threshold differential pressure set points. Because the differential pressure set point indicator can sense both directions of the conduit incline, there are two similar symmetric markings for each desired threshold differential pressure set point. Of course, in other embodiments, a ball-type differential pressure set point indicator may provide for threshold differential pressure information for inclination of the conduit in only one direction, and so the markings may be unidirectional. In such an arrangement, the ball-type differential pressure set point indicator may provide a finer degree of set point adjustment markings for indicating whether the threshold differential pressure between spaces is present.

Figure 9:
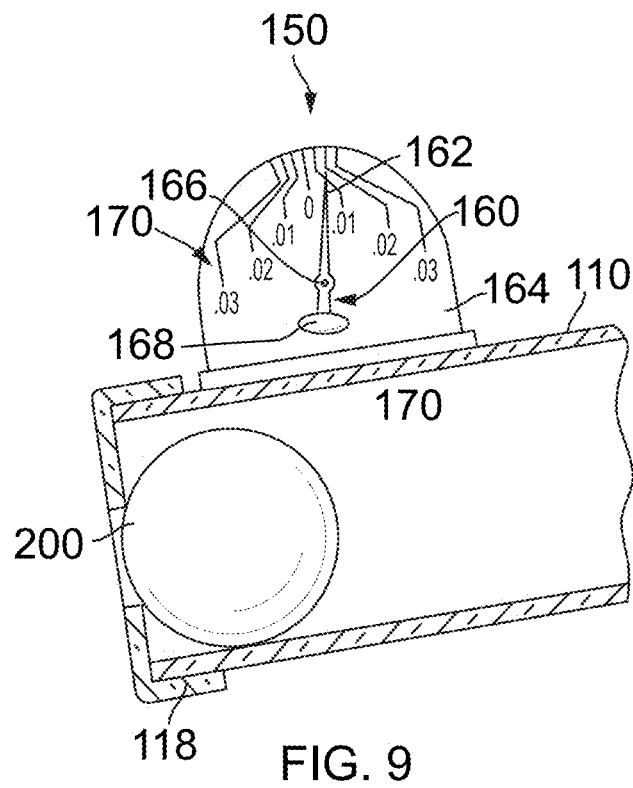
FIG. 9 is a partial cross-sectional view of another embodiment of a differential pressure set point indicator.

FIG. 9 is a partial cross-sectional view of another embodiment of a differential pressure set point indicator 150 having a weighted pointer 160. As shown in FIG. 9, the differential pressure set point indicator 150 is rigidly secured to the outer surface of a conduit 110 via a base plate 164. The differential pressure set point indicator 150 includes a tip pointer 162 that is pivotally connected to the base plate 164. A weight 168 is provided at an end opposite the tip pointer below the pivot point 166. When the conduit 110 is placed within a wall at an angle of inclination with respect to a horizontal plane, the tip pointer 162 will vary in its position and pivot to reflect the degree to which the conduit is tilted with respect to the horizontal.

According to the embodiment shown in FIG. 9, the tip pointer 162 is further adapted to rotate about the pivot point 166 so as to point to the bi-directional reference markings 170 which are calibrated to match the angle of incline with the threshold differential pressure between opposite ends of the conduit 110 at which the ball 200 will be urged against the force of gravity. As such, depending on the angle of incline of the conduit, the tip pointer 162 will come into alignment with reference markings 170 that are calibrated to represent minimum differential pressures required to move and maintain the ball 200 at a desired position within the conduit, for instance, at the highest point.

Figure 10:
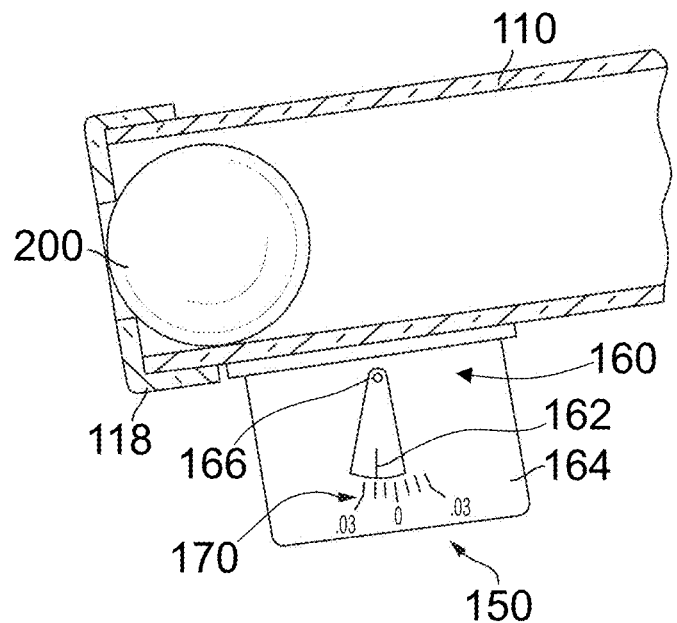
FIG. 10 is a partial cross-sectional view of another embodiment of a differential pressure set point indicator.

FIG. 10 is a partial cross-sectional view of another embodiment of a differential pressure set point indicator 150 configured as a pendulum directional differential pressure set point indicator. The differential pressure set point indicator 150 is rigidly secured to an outer surface of a conduit 110 via a base plate 164. The differential pressure set point indicator 150 includes a pendulum pointer 162 that is pivotally connected to the base plate 164 at a point 166. Here, the pendulum pointer 162 extends downwardly and rotates about the pivot point 166 so as to point to the bi-directional reference markings 170 which are calibrated similarly to that described above regarding FIG. 9.

Thus, given a desired minimum differential pressure between enclosed spaces that are separated by a barrier through which a conduit extends, appropriately calibrated differential pressure set point indicators like those discussed with reference to FIGS. 6-10 may allow the angle of inclination of the conduit to be easily adjusted to suit the desired directional pressure differential. That is, the conduit of a device installed into a wall separating two enclosed spaces may be oriented at a particular angle that corresponds to a threshold differential pressure set point between the separate spaces sufficient to cause a ball, or other movable element, disposed within the conduit to move from the lower end to the higher end of the conduit. When it is desired for that threshold differential pressure between the separate enclosed spaces to be altered, the differential pressure set point indicator, with appropriately calibrated reference markings, may be used as an easy reference to determine what the adjusted angle of the conduit should be to correspond to the new differential threshold pressure.

Figure 11:
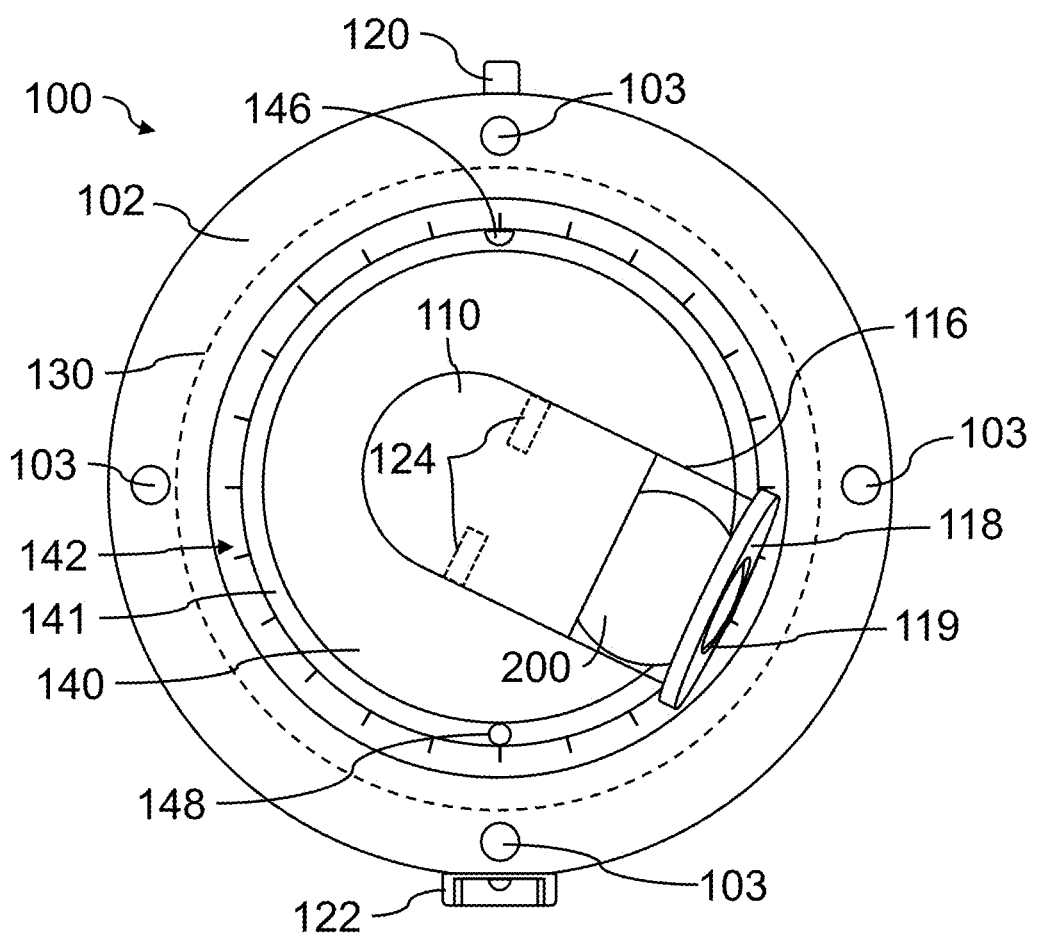
FIG. 11 is a front schematic of another embodiment of a device for indicating a directional differential pressure.

FIG. 11 is a front schematic of another embodiment of a device 100 for indicating a directional differential pressure. According to the embodiment shown in FIG. 11, the device includes a base plate 102 which may be secured to a barrier with a plurality of fasteners 103. A pivot arm (e.g., a conduit) 110 and a rotatable base 140 are together rotatably secured to the base plate so that the pivot arm and rotatable base may be rotated together about an axis transverse (e.g., perpendicular) to the barrier on which the base plate is secured. The pivot arm includes a movable element (e.g., a ball) 200 which is configured to move between end stop 118 and internal stops 124 based on a force balance between gravity and any differential pressure between spaces fluidly connected though the pivot arm to indicate the presence of a differential pressure or lack thereof. As discussed previously, the device 100 also includes a first level 120 to indicate alignment of the rotational axis of the pivot arm and rotatable base with a horizontal plane, whereas the second level 122 indicates alignment of the base plate 102 in particular roll orientation relative to the same rotational axis.

As shown in FIG. 11, the device 100 includes a vial 141 disposed on the rotatable base 140. Disposed in the vial is a fluid (e.g., liquid), an air bubble 146, and a weighted ball 148. A plurality of markings 142 are also disposed on the rotatable base and accordingly rotate when the rotatable base is rotated. The markings are disposed at intervals and correspond to particular angles of inclination of the pivot arm 110. The air bubble and weighted ball move as the pivot arm and rotatable base are rotated to indicate the current differential threshold pressure set point corresponding to the angle of inclination relative to a horizontal plane. In contrast to prior embodiments, as the vial 141 and markings 142 are both disposed on the rotatable base 140 and are rotatable, the indication of the threshold differential pressure is accurate regardless of the roll orientation of the base plate. That is, in contrast to stationary markings formed on the base plate 102 or another structure fixed to a barrier, the markings are linked to the position of the pivot arm 110. Accordingly, in the embodiment of FIG. 11, the base plate does not need to be aligned in a roll orientation relative to a rotational axis of the pivot arm using second level 122 to provide accurate differential pressure threshold readings. Thus, the embodiment of FIG. 11 greatly simplifies installation and accurate threshold pressure setting. According to the embodiment of FIG. 11, the marks indicate pressure values, or may correspond to lookup values in separate chart.

In some cases, the first level 120 may be arranged as a curved tube where the curve is disposed in a single plane. In such an arrangement, the first level 120 may provide accurate readings when the first level is correctly oriented and aligned in a vertical plane, or another plane for which the curve is calibrated, but may provide inaccurate or distorted readings when the first level is not in the vertical or calibrated plane. Thus, when the first level is arranged with a vial having a single curve which is not agnostic to a roll orientation of the first level relative to a horizontal axis, it may be desirable for a user to receive indication as to the accuracy of the first level, so that the alignment of axis of rotation of the rotatable base 140 with a horizontal plane may be discovered accurately. Accordingly, second level 122 may be used to determine whether the first level 120 is correctly oriented or aligned in a vertical plane (or another plane of calibration) so that the user can confirm that the first level is providing an accurate reading. The second level may be a barrel vial level which itself is agnostic to a roll orientation of the second level and may therefore provide an accurate reading as to the alignment of the first level with a vertical plane. In some embodiments, the air bubble 146 and/or weighted ball 148 may be used to indicate whether the first level 120 is aligned in a vertical plane. For example, alignment of the air bubble and/or weighted ball with the first level 120 may indicate that the first level is in a vertical plane. In one embodiment, a line or other marking disposed on the wall plate 102 may assist a user in checking the alignment of the air bubble and/or weighted ball with the first level. Of course, any suitable arrangement of levels or vials may be employed to indicate whether the first level 120 is providing an accurate measurement or reading, as the present disclosure is not so limited.

In some cases, the second level may be arranged as a curved tube level where the curve is disposed in a single plane. In such an arrangement, the second level 122 may provide accurate readings when the second level is correctly oriented and aligned in a vertical plane, or another plane for which the curve is calibrated, but may provide inaccurate or distorted readings when the second level is not in the vertical or calibrated plane. Thus, when the second level is arranged with a vial having a single curve which is not agnostic to a roll orientation of the second level relative to a horizontal axis, it may be desirable for a user to receive indication as to the accuracy of the second level, so that the correct roll orientation of the wall plate 102 may be determined. Accordingly, first level 120 may be used to determine whether the first level 120 is correctly oriented or aligned in a vertical plane (or another plane of calibration) so that the user can confirm that the first level is providing an accurate reading. The first level may be a barrel vial level which itself is agnostic to a roll orientation of the first level and may therefore provide an accurate reading as to the alignment of the second level in a vertical plane. Of course, any suitable number and type of levels (including curved tube levels and barrel vial levels) may be employed to verify the accuracy of other levels employed in a device or differential pressure set point indicator, as the present disclosure is not so limited.

Figure 12:
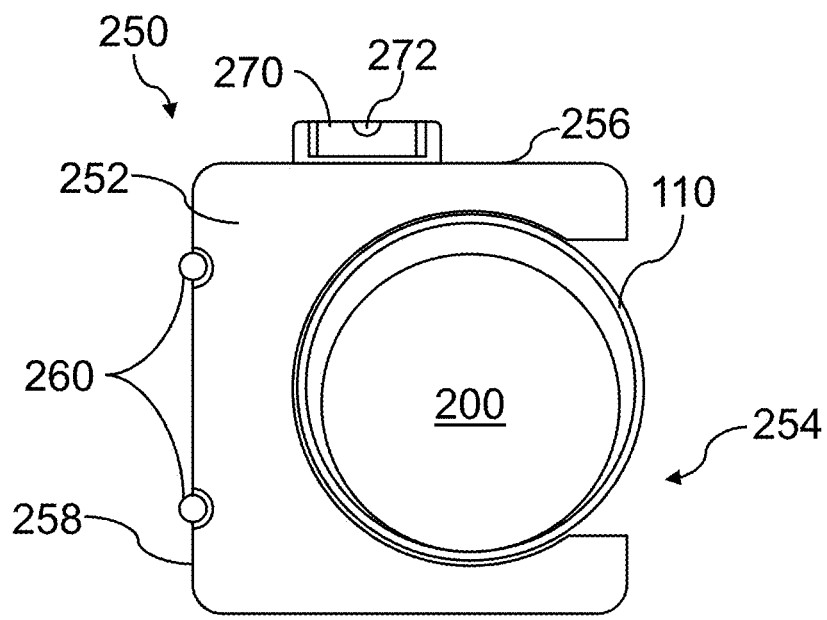
FIG. 12 is a front view of another embodiment of a differential pressure set point indicator.

FIG. 12 is a front view of another embodiment of a differential pressure set point indicator 250 configured to provide an accurate differential pressure set point indication regardless of movement of a conduit 110 outside of a vertical plane. As noted previously, the accuracy of inclinometers and other threshold indicating devices may be dependent on the alignment of the inclinometer with a vertical plane. That is, an inclinometer attached to a conduit which moves in a non-vertical plane may need special calibration or may otherwise report inaccurate values as the conduit is moved. For example, if a conduit is moved in a roll direction so that an attached differential pressure set point indicator is also moved in roll as the conduit is moved, the effect of gravity on an air bubble, weighted ball, pointer, etc. may cause the reported differential pressure to be inaccurate. The indicator of FIG. 12 addresses the susceptibility of the indicator to movement outside of a vertical plane by allowing the indicator itself to rotate about the conduit 110 to align the indicator with an indication plane (e.g., a vertical plane).

As shown in FIG. 12, the differential pressure set point indicator 250 includes a support 252 which is secured to the conduit 110 which contains a movable element 200. In particular, the conduit has been placed inside the support through an opening 254. According to this embodiment, the support is flexible so that the support may be coupled to the conduit in a direction transverse to a longitudinal axis of the conduit. In this and other embodiments, the support may also be attached to the conduit in a direction parallel to the conduit's longitudinal axis (e.g., by fitting the support over an end of the conduit). Of course, in other embodiments the support may be rigid and/or may completely surround the conduit, as the present disclosure is not so limited. The support 252 allows for rotation of the indicator about the longitudinal axis of the conduit (i.e., in a roll direction). In the embodiment of FIG. 12, the support and conduit may be a suitably low coefficient of friction to allow the support to be rotated on the conduit either under force from a user or under passive urging (e.g., with weight). In other embodiments, the support may include a bushing or bearing coupling the support to the conduit to reduce the friction of the support as it rotates about the conduit.

According to the embodiment in FIG. 12, the support includes a horizontal face 256 and a vertical indication face 258. A vial 260 is disposed on the vertical indication face which includes a weighted ball and an air bubble which are used to indicate the differential pressure threshold corresponding to an angle of inclination of the conduit. In particular, the vial is used to indication an angle of inclination of the horizontal face 256 relative to a horizontal plane. As shown in FIG. 12, the horizontal face 256 includes a level 270 including a bubble 272 which indicates alignment of the horizontal face 256 with a horizontal plane. In some embodiments, the level may be a barrel vial level which accurately indicates alignment with the horizontal plane if the level 270 is not in a horizontal plane. As noted previously, the horizontal face may be inclined relative to the horizontal plane. Accordingly, the level 270 indicates alignment of the horizontal face with a horizontal plane when the conduit is level. The level 270 also indicates when the indication face is aligned with a vertical plane (i.e., an indication plane). Thus, regardless of the inclination and position of the conduit 110, the support may be rotated about the conduit until the indication face is aligned with an indication plane, as indicated by the level. In the depicted embodiment, the indication plane is a vertical plane, although other indication planes may be employed, as the present disclosure is not so limited.

Figure 13:
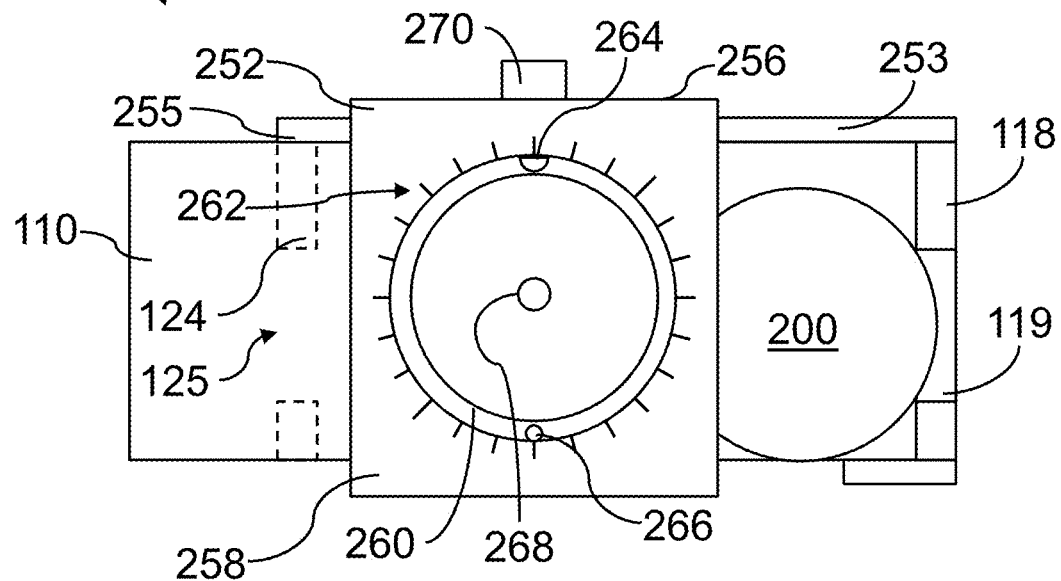
FIG. 13 is a side view of the differential pressure set point indicator of FIG. 12.

FIG. 13 is a side view of the differential pressure set point indicator 250 of FIG. 12 clearly showing the indication face 258 including vial 260. As shown in FIG. 13, the vial includes an air bubble 264 and a weighted ball 266 which move to different portions of the vial under the effect of gravity (i.e., weight) as the conduit 110 is inclined relative to a horizontal plane. A plurality of markings 262 are disposed in intervals around the vial and denote various pressure values or correspond to lookup pressure values in a separate chart. As noted previously, regardless of the orientation and position of the conduit, the support 252 may be rotated about the longitudinal axis of the conduit until the level 270 indicates the indication face 258 is aligned with an indication plane (e.g., a vertical plane) so that the values reported by the markings 262 are accurate.

As shown in FIG. 13, in some embodiments the differential pressure set point indicator 250 also includes a set screw 268 which may be used to secure the support 252 to the conduit 110 so that the differential pressure set point indicator is not rotatable about the conduit. Such an arrangement may be desirable when the conduit and differential set point indicator are positioned in correct positions, so that inadvertent contact (e.g., bumping) does not move the differential set point indicator 250 out of alignment with the indication plane. In other embodiments, a spring loaded detent may engage a depression or receptacle formed on the conduit to resist rotation of the differential pressure set point indicator about the conduit. In still other embodiments, the support 252 may include a clamp which reduces the diameter of the support to increase friction between the support and the conduit to rotatably secure the differential pressure set point indicator to the conduit. Of course, any suitable rotation stop may be employed to selectively inhibit rotation of the support 252 about the conduit, as the present disclosure is not so limited.

According to the embodiment depicted in FIG. 13, the differential pressure set point indicator 250 includes an end stop connector 253 which couples rotation of the end stop 118 to the rotation of the support 252 about the conduit 110. That is, when the differential pressure set point indicator is rotated about the conduit the end stop is also rotated about the conduit. As will be discussed further with reference to FIG. 14, the end stop may have an off-center orifice 119 relative to the conduit for receiving the movable ball 200, and this rotation may ensure the axis of the orifice is aligned with a center of the ball. Alternatively or in combination to the end stop connector, the end stop 118 may include ramps configured to align the center of the ball 200 with the center of the orifice when the ball abuts the end stop or internal stop.

Figure 14:
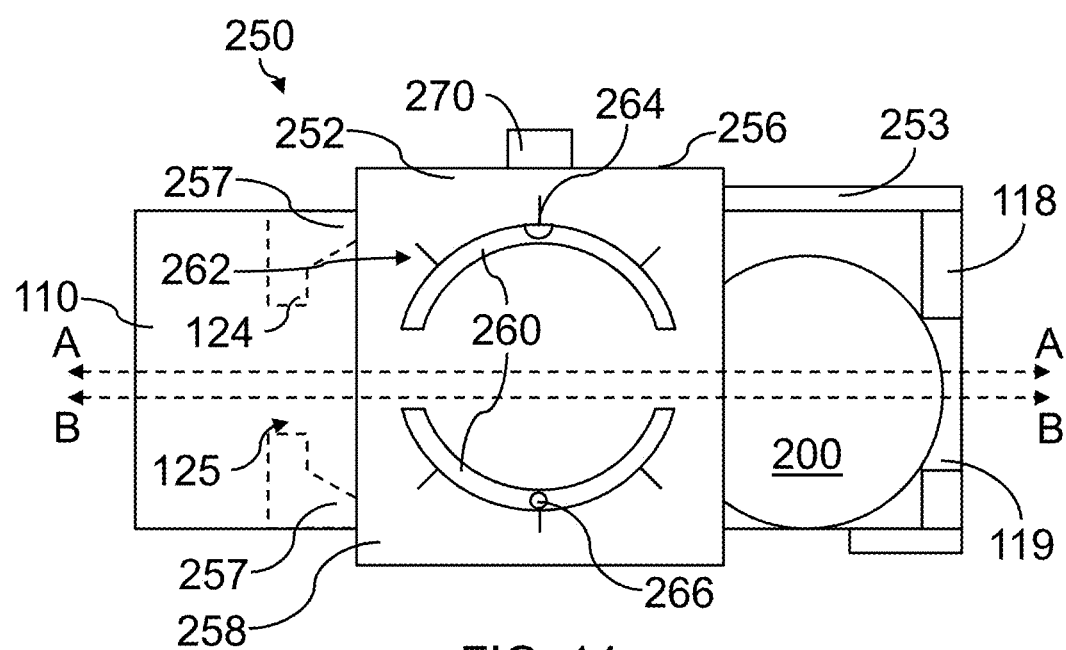
FIG. 14 is a side view of another embodiment of a differential pressure set point indicator.

According to the embodiment of FIG. 14, the differential pressure set point indicator 250 may also be coupled to an internal stop 124 disposed in the conduit via an internal stop connector 255. Similarly to the end stop connector 253 and end stop 118, rotation of the differential pressure set point indicator 250 may rotate the internal stop so that an orifice 125 formed in the internal stop aligns with a center of the ball 200. The alignment of the orifice of the internal stop may be indicated to a user via a bubble level indicating a predetermined roll position, or with markings disposed around a circumference of the conduit. As the differential pressure set point indicator 250 may rotate automatically (i.e., under urging from weight), the orifice of the internal stop may be aligned with the center of the ball automatically. In some embodiments, the internal stop may include a centered orifice and a ramp on which a movable element (e.g., a ball) may ride up on in response to a differential pressure. The ramp may be formed around a circumference of the orifice and sized and shapes to ensure alignment of a center of the ball with the orifice when the ball abuts the internal stop. For example, the ramp may be frustoconical in some embodiments. Thus, the differential pressure set point indicator 250 may automatically or manually align the centerline of an orifice formed in an end stop and internal stop to limit fluid (e.g., air) flow through a conduit. In some embodiments, the internal stop may be a unitary component such as a disk with an orifice formed therein. In other embodiments, the internal stop may be configured as one or more posts or walls which restrict movement of the ball 200 in the conduit 110.

FIG. 14 is a side view of another embodiment of a differential pressure set point indicator 250 showing the functionality of the end stop connector 253. As shown in FIG. 14, and noted previously, the end stop 118 includes an orifice which is off-center relative to a longitudinal axis of the conduit 110. That is, the conduit has a central longitudinal axis A-A about which the indicator 250 and end stop 118 rotate. However, the orifice is centered on axis B-B which is offset from the longitudinal axis of the conduit. The axis B-B is aligned with a center of movable ball 200 which is sized and shaped to roll inside the conduit 110 and accordingly has a center which is disposed below the longitudinal axis of the conduit. If the conduit is moved and undergoes a change in roll orientation (i.e., rotation about its longitudinal axis A-A), the ball 200 will move toward the lowest point under the effect of gravity (i.e., weight) so that the center of the ball and the central axis B-B of the orifice are no longer aligned. As a result, when the ball abuts the end stop 118, the ball may not form an effective air barrier with the orifice as would be the case if the central axis of the orifice and the center of the ball were aligned. According to the embodiment of FIG. 14, the end stop connector 253 allows the end stop 118 and orifice central axis B-B to be adjusted to match the center of the ball 200. That is, when the indicator 250 is rotated about the longitudinal axis to align the indication face 258 with an indication plane (e.g., vertical plane), the orifice central axis will also be moved into alignment with the center of the ball 200, so that an air barrier may be formed when the ball is received in the orifice. Of course, in other embodiments the end stop may be separately adjustable or otherwise not linked to the differential pressure set point indicator 250, as the present disclosure is not so limited.

As shown in FIG. 14, the internal stop 124 includes ramps 257 which are formed around the circumference of the conduit 110. When the ball 200 is urged by gravity (i.e., weight) or a differential pressure, the ball will ride up on the ramp 257 so that the center axis B-B of the ball 200 is aligned with the center axis A-A of the internal stop orifice 125. Accordingly, the internal stop may remain stationary relative to the conduit 110 and will still ensure the movable element 200 forms a fluid barrier with the internal stop when the movable element abuts the internal stop. In some embodiments, such an arrangement may also be employed with regards to the end stop 118 so that the end stop connector 253 is omitted. Of course, any suitable combination of ramps and rotatable offset orifices may be employed with a differential set point indicator, as the present disclosure is not so limited.

As shown in FIG. 14, alternative forms of the vial 260 may be employed to indicate the differential pressure set point. The vial 260 of FIG. 14 is split into two separate vials, with one vial containing the air bubble 264 and the other vial containing the weighted ball 266. Of course, any suitable indicator may be employed, as the present disclosure is not so limited.

In some embodiments, an end stop that forms a suitable fit (e.g., interference fit, snap fit) over an end of a conduit may include a sound attenuator. In some cases, a movable element may be a plastic ball (e.g., a ping pong ball) and the end stop may be made of a hard plastic. Thus, without inclusion of the sound attenuator between the conduit and the end stop, when the ball impacts against the end stop, an abrupt sound may be produced which can be easily heard by a person located in the space where the impact occurs, and possibly in an adjacent space where the other open end of the conduit resides. When the sound attenuator is placed between the conduit and the end stop, impact of the ball against the sound attenuator will produce a much softer sound which is not as readily noticeable as compared with the sound produced when the energy-absorbing material is not present. The sound attenuator may be formed in a separate layer on the end stop, or may be integrated into the end stop (e.g., the end stop may exhibit a geometry similar to a diaphragm), as the present disclosure is not so limited.

In some embodiments, there may not be an alignment of the travel path of the center of the ball and an opening at the end of the conduit. For example, an interior-facing portion of an opening at the end of the conduit may be arranged and positioned such that the movable element substantially prevents air flow when the movable element abuts the interior-facing portion of the opening, yet a center axis of the opening (e.g., the centroid of the area of the opening) is not aligned with a travel path of a center of the movable element. A ramp may be present toward the end of the conduit such that the movable element is pushed up into the opening.

Figure 15:
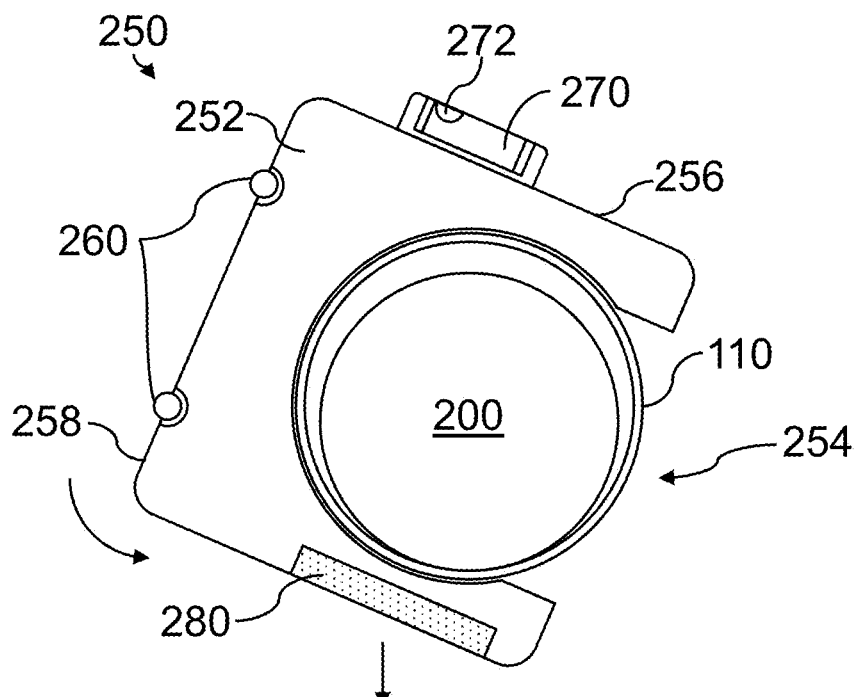
FIG. 15 is a front view of the differential pressure set point indicator of FIG. 12 in a first position.

FIG. 15 is a front view of the differential pressure set point indicator 250 of FIG. 12 in a first position where the indication face 258 is out of alignment with an indication plane, which in this case is a vertical plane. The position shown in FIG. 15 may be produced by movement of the conduit 110 outside of a single vertical plane, which may induce roll of the conduit which would move the indication face out of alignment with the indication plane. The level 270 indicates that the indication face 258 is out of alignment with the indication plane as the air bubble 272 is not centered in the level. Likewise, the level also indicates the horizontal face 256 is out of alignment with a horizontal plane. Accordingly, a user of the differential pressure set point indicator would be aware that the values reported via the vial 260 disposed on the indication face 258 may be inaccurate and that the differential pressure set point indication should be adjusted. As shown in FIG. 15, the differential pressure set point indicator may include a weight 280 which urges the indicator to rotate about the conduit 110, as shown by the arrows. The coefficient of friction between the support 252 and the conduit 110 may be suitably low so that the weight 280 moves the indication face 258 into alignment with the indication plane without any manual adjustment from a user. Accordingly, a user may verify the alignment of the indication face with the indication plane with the level 270, but will generally need to take no action to manually adjust the indicator when the conduit is moved in a roll direction.

Figure 16:
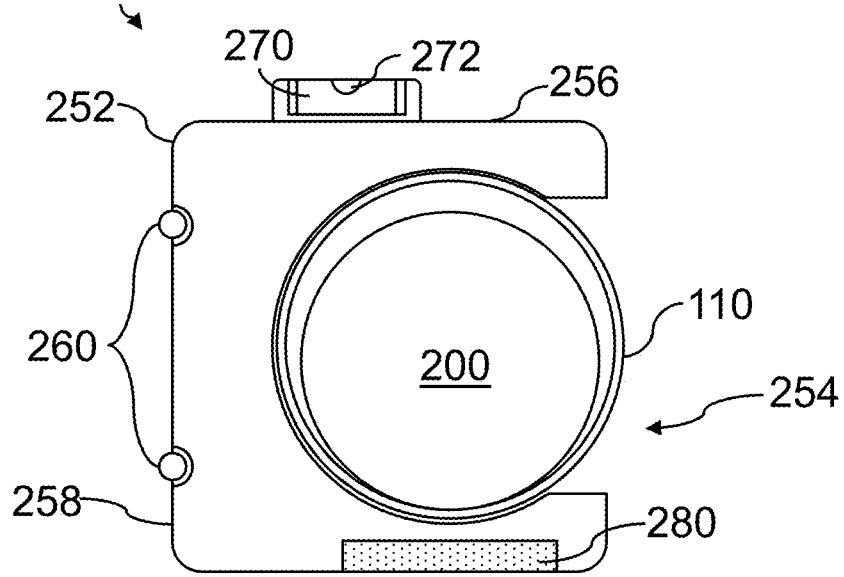
FIG. 16 is a front view of the differential pressure set point indicator of FIG. 12 in a second position.

FIG. 16 is a front view of the differential pressure set point indicator of FIG. 15 in a second position. The second position shows the differential pressure set point indicator properly aligned with the conduit to accurately report pressure threshold values with the vial 260. That is, the indication face 258 is aligned with an indication plane (i.e., a vertical plane) so that markings disposed on the indication face and any weighted balls or air bubbles in the vial are properly calibrated. The level 270 verifies the correct alignment of the indicator 250, as the air bubble 272 is disposed in the center of the vial. In the position shown in FIG. 16, the center of gravity of the indicator 250 may be aligned with the center of the conduit 110 so that there is no moment on the indicator urging the support to rotate about the conduit.

Figure 17:
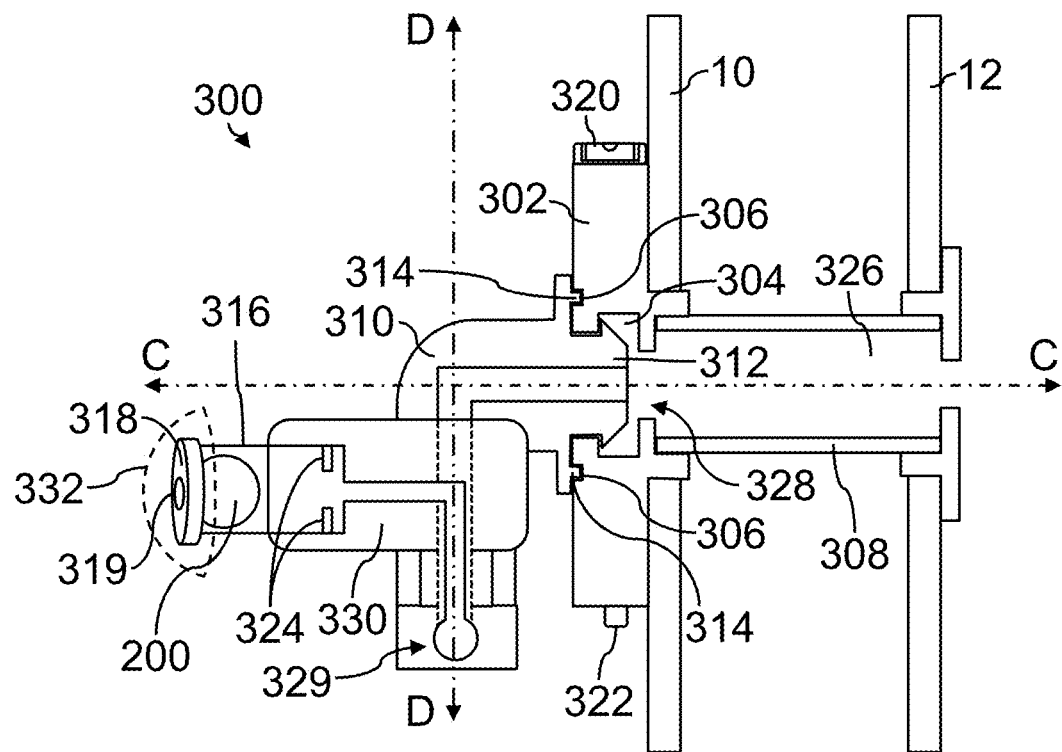
FIG. 17 is a side cross-sectional schematic of another embodiment of a device for indicating a directional differential pressure.

FIG. 17 is a side cross-sectional schematic of another embodiment of a device 300 for indicating a directional differential pressure which allows a second pivot arm (i.e., second conduit) 330 to be positioned anywhere within a semi-spherical range of motion. The device includes a base plate 302 which is fixed to a first side 10 of a barrier. The base plate includes a receptacle which receives a flanged end 312 of a first pivot arm (i.e., first conduit) 310 in a similar manner to the embodiment of FIGS. 1-2. The base plate also includes a groove 306 which receives guides 314 of the first pivot arm which constraint the first pivot arm to rotated about a single axis transverse to the barrier 10, 12. In the depicted embodiment, the first pivot arm rotates about axis C-C which is perpendicular to the barrier. The device also includes a wall conduit 308 which fluidly connects a second space on the second side 12 of the barrier to the first pivot arm. Like the embodiment of FIGS. 1-2, the base plate may also include a first level 320 which indicates alignment of the first pivot arm axis C-C with a horizontal plane, and a second level 322 which indicates a roll orientation of the base plate.

As shown in FIG. 17, the device 300 also includes a second pivot arm 330 which is rotatably coupled to the first pivot arm 310. The second pivot arm is configured to rotate about a second pivot arm axis D-D which is transverse to the first pivot arm axis C-C. For example, in the depicted embodiment, the second pivot arm axis is perpendicular to the first pivot arm axis. The second pivot arm contains a movable element (e.g., a ball) 200, which is contained in the second pivot arm with end stop 318 and internal stops 324. The second pivot arm also includes a transparent window 316 which allows a user to view the movable element in certain states of the device to indicate a presence or lack of a threshold differential pressure between a first space on the first side 10 of the barrier and the second space on the second side 12 of the barrier. An optional shield 332 protects the end stop 318 disposed on the second pivot arm.

As the second pivot arm has two effective axes of rotation (i.e., axis C-C and axis D-D), the second pivot arm may be oriented in any desirable direction within a semi-spherical range of motion regardless of an inclination of the barrier 10, 12. That is, the first pivot arm is rotatable 360° about the first pivot arm axis C-C (i.e., in a roll direction), while the second pivot arm is rotatable at least 180° about the second pivot arm axis D-D (i.e., in a pitch or yaw direction). Accordingly, the second pivot arm may be oriented in any suitable direction within a semi-sphere defined by a combination of the range of motion about each axis individually. Accordingly, any desirable threshold pressure for indication may be achieved by adjusting one or more of the pivot arms about their respective axes. As the first pivot arm is rotatably mounted close to flush with the first side 10 of the barrier, the distance the first and second pivot arms extend from the wall may be reduced. In some orientations, the second pivot arm may extend no further from the wall in a direction perpendicular to the wall than a single pivot arm device, meaning the device of FIG. 17 may be easily employed in areas where space is limited.

According to the embodiment of FIG. 17, the device forms a channel 326 which has a continuous shape and size regardless of the orientation of the first pivot arm 310 or second pivot arm 330. As shown in FIG. 17, the channel begins on one side with wall conduit 308 which fluidly connects to the second space on the second side 12 of the barrier. The channel then transitions to the first pivot arm at first transition 328. The first transition is circular, and does not change in cross-section or otherwise alter flow of air when the first pivot arm is rotated about the first pivot arm axis. The channel then continues through the first pivot arm to a second transition 329 between the first pivot arm and the second pivot arm. Similarly to the first transition, the second transition is also circular and has no change in cross section when the second pivot arm is rotated relative to the first pivot arm. Accordingly, there is no change in air flow path when the second pivot arm is rotated which may otherwise affect the pressure in the second pivot arm. The channel then continues and culminates on the other end at orifice 319 which is formed in the end stop 318. Thus, the entire channel has the same overall shape and size with reference to air flow regardless of the orientation of either the first pivot arm or second pivot arm. Such an arrangement allows for a simpler and more accurate means of calibrating the threshold differential pressure set point markings.

While the first pivot arm 310 and second pivot arm 330 of FIG. 17 may be rotatable in a range of 360° (i.e., ±180°) and 180° (i.e., ±90°), respectively, the first and second pivot arms may be rotatable in any desirable range of motion. In some embodiments, the first and/or second pivot arms may be rotatable by at least ±30°, ±45°, ±60°, ±75°, ±90°, ±115°, ±130°, ±150°, ±180°, or any other desirable range about their respective axes. In other embodiments, one or both of the first and second pivot arms may be pivotable in only one direction. For example, the first and/or second pivot arm may be adjustable between 0° and +90°, 0° and −90°, 0° and +60°, 0° and −60°, and/or any other suitable combination of the above ranges.

In a first space with positive differential air pressure, air may flow in a direction from the first space to the second space. In a space with negative differential air pressure, air may flow into the first space from the second space (i.e., external environment). Depending on the directional differential pressure, the pivot arms may be oriented in different directions so that the movable element 200 may indicate the presence of the correct directional threshold differential pressure.

For a positive pressure first space, the second pivot arm 330 located in the first space may be pitched downward to correspond to a chosen threshold differential pressure. Orienting the second pivot arm 330 downward increases the force needed to push the ball 200 from the transparent window 316 and toward the second pivot arm 330. A positive differential air pressure may move the ball 200 to a stationary position in the pivot arm 330 against the internal stops 324. Not viewing the pressure indicator ball may indicate that the first space has the appropriate positive air pressure relative to the second space. Accordingly, the second space has a corresponding negative pressure relative to the first space. If the pressure indicator is visible within the optically transparent portion 316 of the second pivot arm, the directional differential air pressure may be incorrect or below the pressure for which the device is calibrated and the user may be alerted to that fact.

For a negative pressure first space, the second pivot arm 330 located in the first space may be pitched upward to correspond to a chosen threshold differential pressure. Orienting the pivot arm 330 upward increases the force needed to push the ball 200 from the second pivot arm and toward the transparent window 316. A negative differential air pressure in the first space may move the ball to a stationary position in the transparent window 316 against the end stop 318. Viewing the ball may indicate that the first space has the appropriate negative air pressure relative to the second space. Accordingly, the second space has a corresponding positive pressure relative to the first space. If the ball is not visible within the transparent window 316, the first space differential air pressure is higher than the pressure for which the device is calibrated and the user may be alerted to that fact. Of course, while a ball is shown in FIG. 17, any suitable movable element or indicator may be employed, as the present disclosure is not so limited.

Figure 18:
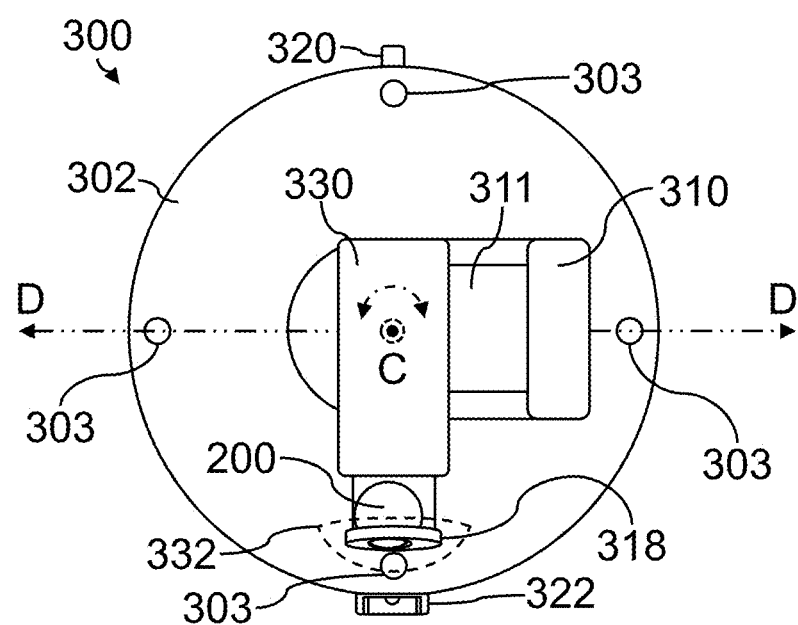
FIG. 18 is a front schematic of the device of FIG. 17.

FIG. 18 is a front schematic of the device 300 of FIG. 17. As shown in FIG. 18, the second pivot arm 330 is oriented in a downward position. As noted previously, the first pivot arm 310 rotates about first pivot arm axis C-C which extends in a direction perpendicular to a barrier to which the base plate 302 is secured with a plurality of fasteners 303. The second pivot arm 330 is rotatably coupled to the first pivot arm via a second pivot arm linkage 311 which allows the second pivot arm to rotate about second pivot arm axis D-D which extends in a direction perpendicular to the first pivot arm axis. Accordingly, the second pivot arm may be oriented in any direction within the range of motion of the first pivot arm and second pivot arm, which in some embodiments may be a semi-spherical range of motion.

Figure 19:
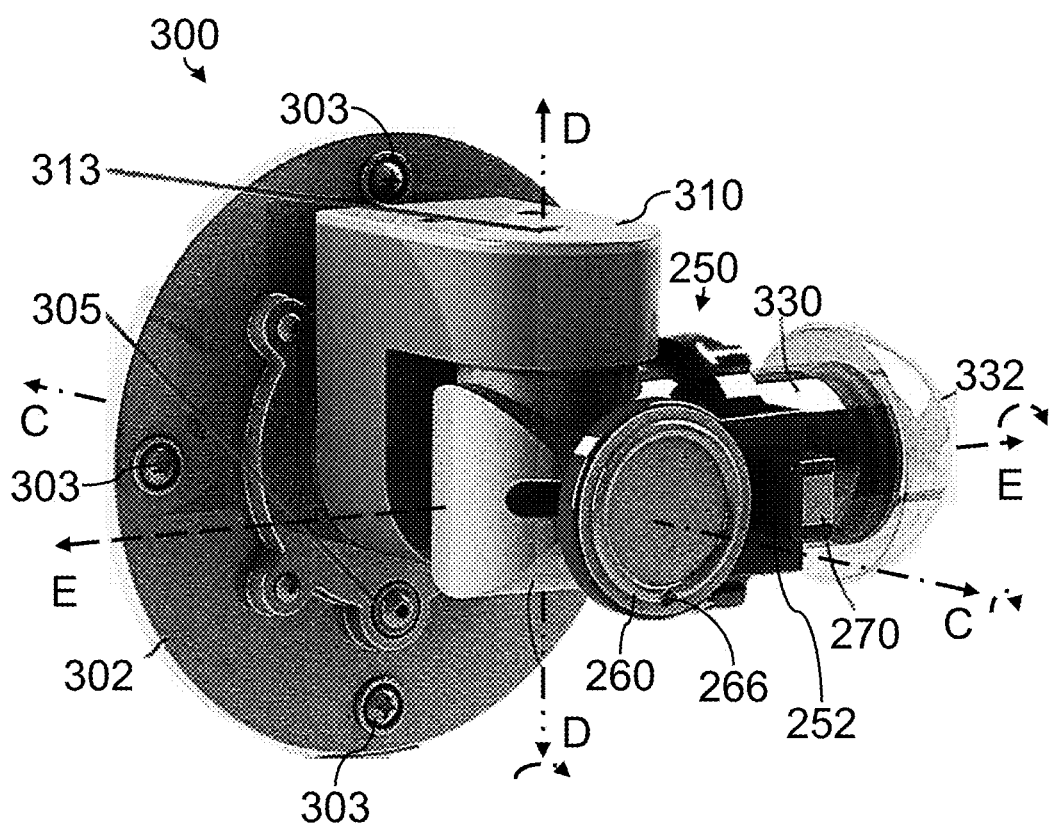
FIG. 19 is a perspective view of another embodiment of a device for indicating a directional differential pressure in a first position.

FIG. 19 is a perspective view of another embodiment of a device 300 for indicating a threshold directional differential pressure in a first position. The device of FIG. 19 is similar to that shown in FIGS. 17-18, insofar as the device includes a first pivot arm 310 which rotates about a first pivot axis C-C transverse to a barrier and a second pivot arm 330 which rotates about a second pivot arm axis D-D which is transverse to the first pivot arm axis. The device is secured to a barrier via a base plate 302 via a plurality of fasteners 303. A movable element is disposed in the second pivot arm 303 and is configured to indicate the presence or lack of a threshold directional differential pressure. In contrast to the embodiment of FIGS. 17-18, the device of FIG. 19 includes a differential pressure set point indicator 250 which is arranged similarly to the indicator of FIG. 12. That is, the indicator includes a support 252 which is rotatable secured to the second pivot arm, so that the indicator may be rotated about a longitudinal axis E-E of the second pivot arm. The indicator may be rotated about the second pivot arm to align a vial 260 with an indication plane, which in the depicted embodiment is a vertical plane. A weighted ball 266 disposed in the vial may be used to indicate the differential pressure threshold at which a movable element disposed in the second pivot arm (see FIG. 20) is visible or invisible as a result of differential pressure. The indicator also includes a level 270 which indicates correct alignment of the vial with the indication plane. As the second pivot arm is oriented in any position, the indicator 250 may be rotated about the longitudinal axis E-E to align the vial 260 in an indication plane.

In some embodiments, the indicator 250 may be rigidly secured to the second pivot arm 330 so that the relative angle of the indicator may not be changed relative to longitudinal axis E-E. In such an embodiment, the first pivot arm 310 and second pivot arm 330 could be adjusted until the level 270 indicates the vial 260 is aligned in an indication plane. Accordingly, the arrangement of the pivot arms may allow for a correct indication of threshold pressure even if the differential pressure set point indicator 250 is not rotatable relative to the second pivot arm.

As shown in FIG. 19, the device also includes a first pivot arm rotation lock 305 and a second pivot arm rotation lock 313. In the embodiment of FIG. 19, each of the rotation locks are arranged as screws which may be tightened to prevent rotation of either the first pivot arm or second pivot arm about their respective axes. Such an arrangement is beneficial in permanent or semi-permanent installations where the threshold pressure may be a constant value and there is no need to adjust the device after it is properly oriented and calibrated. Of course, any suitable arrangement may be employed to selectively restrict the rotation of either the first pivot arm or second pivot arm, including detents as one example, as the present disclosure is not so limited.

Figure 20:
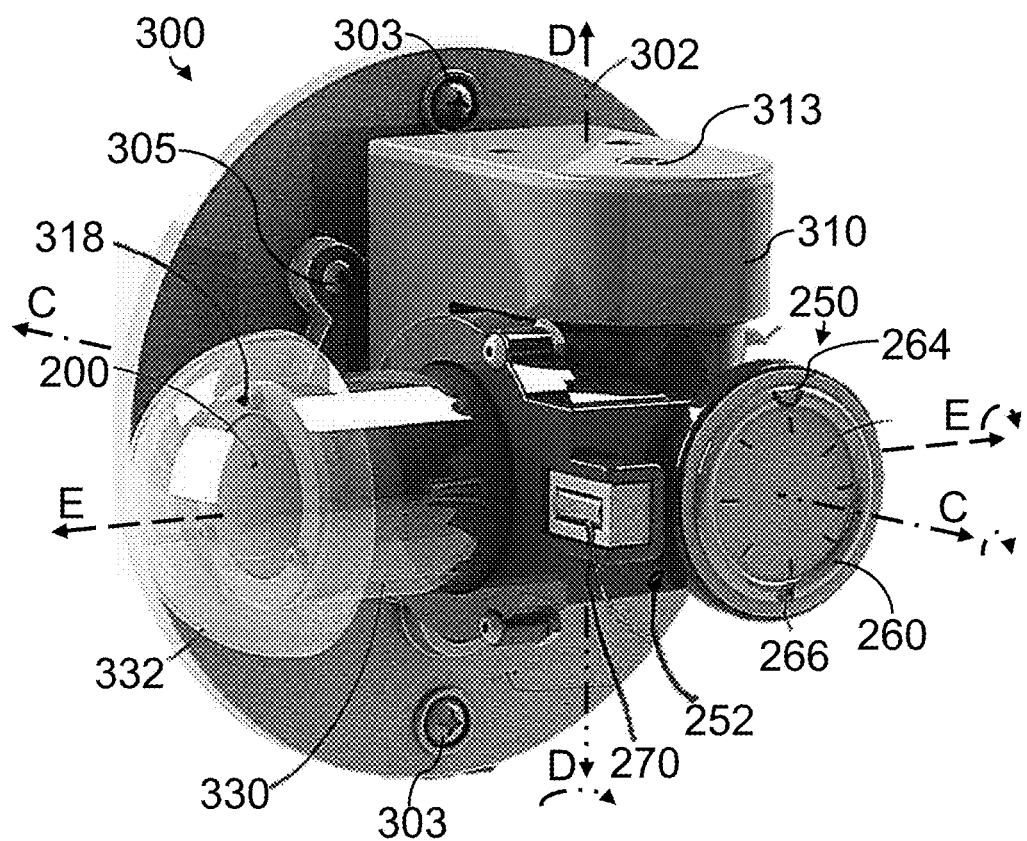
FIG. 20 is a perspective view of the device of FIG. 19 in a second position.

FIG. 20 is a perspective view of the device 300 of FIG. 19 in a second position. Relative to the position shown in FIG. 19, the second pivot arm 330 has been rotated about the second pivot arm axis D-D approximately 180° which may be the approximate rotational range of the second pivot arm. As clearly shown in FIG. 20, a movable element (e.g., a ball 200) is disposed in the second conduit and is responsive to differential pressure between two spaces connected by the device and gravity (i.e., weight). A shield 332 protects the movable element. The level 270 is also clearly shown in FIG. 20 disposed on the differential pressure set point indicator 250 which indicates an alignment of the vial 260 with the indication plane. According to the position shown in FIG. 20, the indicator has been rotated approximately 180° about the longitudinal axis E-E of the second pivot arm so that the vial 260 is properly displayed and aligned with an indication plane. An air bubble 264 is also shown in FIG. 20 which may be used alone or in combination with weighted ball 266 to indicate a differential pressure threshold.

Figure 21:
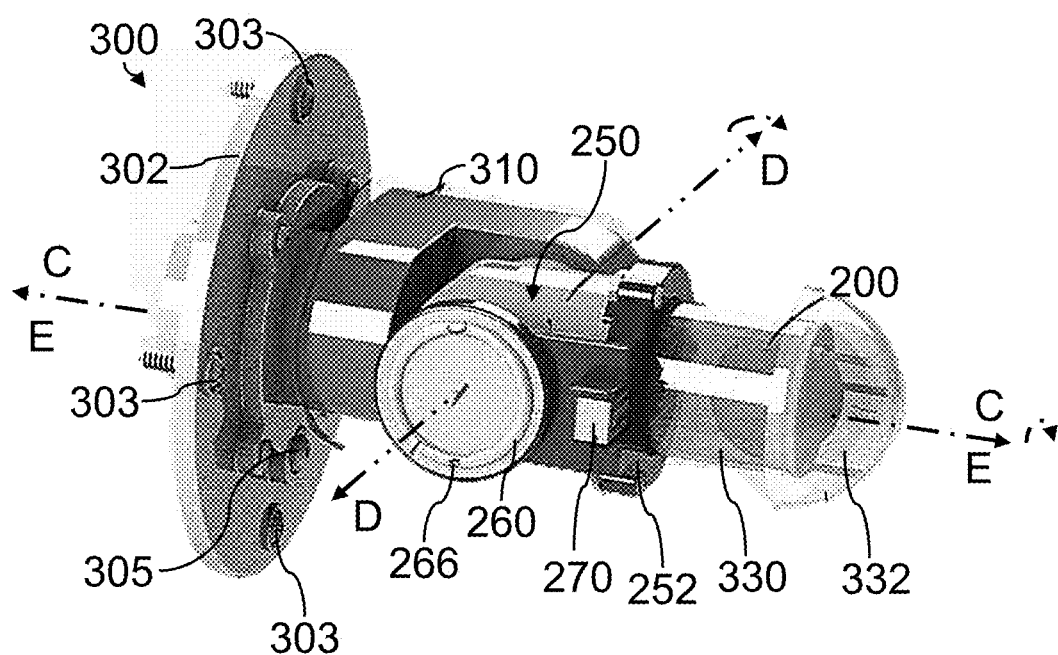
FIG. 21 is a perspective view of the device of FIG. 19 in a third position.

FIG. 21 is a perspective view of the device 300 of FIG. 19 in a third position. Compared with the position of FIG. 20, the first pivot arm 310 has been rotated approximately 90° relative to the first arm pivot axis C-C. The second pivot arm 330 has also been rotated approximately 90° so that the longitudinal axis E-E of the second pivot arm has been aligned with the first pivot arm axis. Accordingly, in the position of the first pivot arm 310 shown in FIG. 21, the second pivot arm effectively functions as a turret-type pivot arm and its rotation about the second pivot arm axis adjusts the inclination of the second pivot arm relative to a horizontal plane. The differential pressure indicator 250 has also been rotated approximately 90° so that the vial 260 is aligned with an indication plane.

Figure 22:
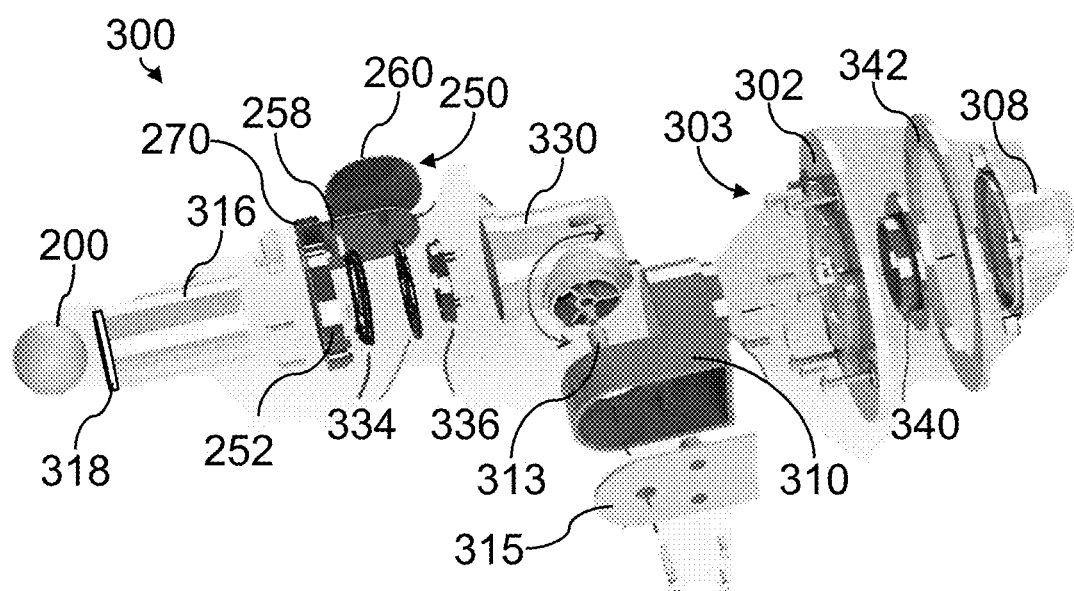
FIG. 22 is an exploded view of the device of FIG. 19.

FIG. 22 is an exploded view of the device 300 of FIG. 19. As shown in FIG. 22, base plate 302 cooperates with a backing ring 342 which is disposed on an opposite side of a barrier so that fasteners 303 arranged as screws can secured the base plate to the barrier. The base plate also secured a rotational coupling 340 which received the first pivot arm 310 and enables rotation of the first pivot arm about the first pivot arm axis. A wall conduit 308 is fluidly coupled through the rotational coupling and to the first pivot arm. The first pivot arm 310 includes a spindle 313 which forms a rotational coupling for the second pivot arm and a cover plate 315 which forms the air channel through the first pivot arm when secured. A cover plate 315 may be appropriate when the first pivot arm is injection molded. In other embodiments, the first pivot arm may be unitary and may be formed with any suitable manufacturing process such as 3D printing, as the present disclosure is not so limited. The second pivot arm 330 is rotatably mounted on the spindle 313 and includes a transparent conduit 316 which enables the movable element 200 to be seen through the transparent conduit in certain states of the device. The second pivot arm includes internal stop 336 which retains the movable element within the second pivot arm. As shown in FIG. 22, the threshold differential pressure indicator 250 includes a support and support O-rings 334. The O-rings may assist in providing an appropriate air seal between the components of the second pivot arm. In some embodiments, the O-rings may also increase the coefficient of friction between the support 252 and the second pivot arm so that the differential pressure indicator is rigidly secured to the second pivot arm.

Figure 23:
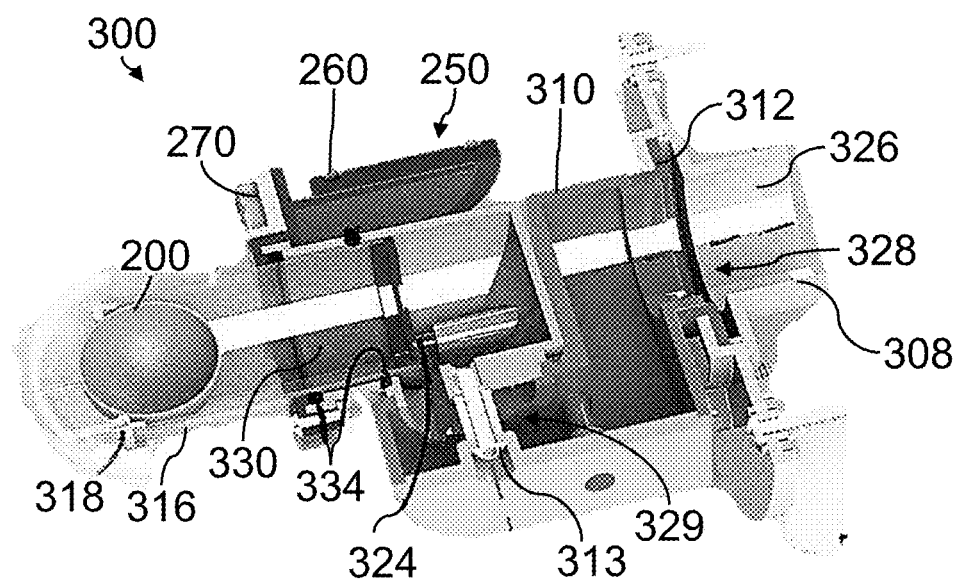
FIG. 23 is a cross-sectional view of the device of FIG. 19.

FIG. 23 is a cross-sectional view of the device 300 of FIG. 19. As shown in FIG. 23 and similar to the embodiment of FIGS. 17-18, the device of FIG. 23 forms a fluid (e.g., air) channel with a constant overall shape regardless of the relative positioning of either the first pivot arm and second pivot arm. That is the cross section of the air channel 326 remains unchanged throughout the device when either the first pivot arm or second pivot arm are rotated about their respective axes. As shown in FIG. 23, the channel 326 includes a first transition 328 which is circular and is aligned with a direction of the first pivot arm axis. Accordingly, when the first pivot arm is rotated there is no change to the first transition 328 which would affect air flow. Likewise, a second transition 329 is also circular and aligned with a direction of the second pivot arm axis. Accordingly, the second transition also does not change in a manner which would affect airflow when the second pivot arm is rotated. Thus, the device shown in FIG. 23 ensures consistent airflow through channel 326 regardless of the orientation of the first pivot arm 310 and second pivot arm 330.

It should be noted that while screws are shown in exemplary embodiments described herein, any suitable arrangement may be employed to join various components such as pivot arms, base plates etc. For example, press-fit, snap together elements, positioning detents, and adhesives may be used alone or in combination to replace the screws and supplement the screws shown herein.

The conduit(s) of exemplary embodiments described herein may include any suitable material. In some embodiments, the conduit(s) may be made up of glass, plastic, or another appropriate material. In some cases, the conduit(s) may be transparent or translucent so that the movable element within the conduit is viewable to an observer. In some embodiments, the conduit(s) are rigid, though, in various embodiments, the conduit(s) are flexible. The device may include a combination of rigid and flexible conduits. A conduit need not be cylindrical in shape as any suitable shape may be used.

In some cases, devices of exemplary embodiments described herein may include a fire stop system that, upon the detection of a threshold level of smoke or fire, provides a barrier that blocks or otherwise mitigates travel of the smoke/fire from one space or room to another. The fire stop system may include various components used to seal the passage within the wall. For example, the fire stop may include an intumescent substance that swells significantly as a result of heat exposure. The fire stop materials may be appropriately installed, for example, employing intumescent material as known to those of ordinary skill in the art. In some cases, the intumescent substance may produce char, which is a substance that acts to retard heat transfer. Devices of exemplary embodiments herein may be employed in fire-rated or non-fire-rated applications, as the present disclosure is not so limited.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A device for indicating a presence of a directional differential pressure between a first space and a second space separated from the first space by a barrier, the device comprising:

a rotatable base configured to be rotatably attached to the barrier, wherein the rotatable base includes a first conduit, and wherein the rotatable base rotates about a first axis transverse to the barrier;

a pivot arm coupled to the rotatable base and including a second conduit fluidly connected to the first conduit, wherein the pivot arm is configured to rotate about a second axis transverse to the first axis; and at least one movable element disposed within the second conduit and movable from a first, vertically lower region of the pivot arm to a second, vertically higher region of the pivot arm in response to the directional differential pressure between the first space and the second space being greater than a threshold differential pressure.

2. The device of claim 1, further comprising a differential pressure set point indicator rotatably mounted to the pivot arm, wherein the differential pressure set point indicator is configured to indicate a set point for the threshold differential pressure when the differential pressure set point indicator is aligned with an indication plane.

3. The device of claim 2, wherein the differential pressure set point indicator is rotatable about a longitudinal axis of the pivot arm.

4. The device of claim 2, wherein the differential pressure set point indicator includes a level configured to indicate alignment of the differential pressure set point indicator with the indication plane.

5. The device of claim 4, wherein the level is a barrel vial bubble level.

6. The device of claim 4, wherein the indication plane is a vertical plane.

7. The device of claim 2, wherein the differential pressure set point indicator includes at least one vial shaped in an arc and at least one movable marker disposed in the at least one vial.

8. The device of claim 7, wherein the at least one movable marker includes at least one selected from a group of an air bubble and a weighted ball.

9. The device of claim 2, wherein the differential pressure set point indicator is urged to rotate about the pivot arm to align the differential pressure set point indicator with the indication plane.

10. The device of claim 9, wherein a weight urges the differential pressure set point indicator to align the differential pressure set point indicator with the indication plane.

11. The device of claim 1, wherein the second axis revolves about the first axis when the rotatable base is rotated about the first axis.

12. The device of claim 1, wherein the first axis is perpendicular to the barrier.

13. The device of claim 12, wherein the second axis is perpendicular to the first axis.

14. The device of claim 1, wherein the rotatable base has a 360° range of motion relative to the first axis and the pivot arm has a 180° range of motion relative to the second axis so that the second conduit has a semi-spherical range of motion.

15. The device of claim 1, wherein an overall shape of the first conduit and the second conduit remains the same regardless of a relative position of the rotatable base and the pivot arm about the first axis and the second axis, respectively.

16. The device of claim 1, wherein the second conduit includes an internal stop disposed in a portion of the second conduit, wherein the internal stop keeps the at least one movable element inside the second conduit.

17. The device of claim 1, wherein the second conduit is movable to an inclination of at least 30° relative to a horizontal plane in a positive or a negative direction.

18. The device of claim 17, wherein the second conduit is movable to an inclination of 90° relative to the horizontal plane in the positive or the negative direction.

19. The device of claim 1, wherein the second conduit includes a rotatable end stop configured to retain the at least one movable element in the second conduit.

20. The device of claim 19, wherein the rotatable end stop includes an orifice sized and shaped to receive the at least one movable element such that a fluid barrier is formed by the at least one movable element when the at least one movable element abuts the orifice.

21. The device of claim 1, wherein the second conduit includes a rotatable internal stop configured to retain the at least one movable element in the second conduit.

22. The device of claim 21, wherein the rotatable internal stop includes an orifice sized and shaped to receive the at least one movable element such that a fluid barrier is formed by the at least one movable element when the at least one movable element abuts the orifice.

23. The device of claim 1, wherein the second conduit includes an opaque portion configured to hide the at least one movable element and a transparent portion configured to show the at least one movable element, wherein visibility of the at least one movable element indicates whether the directional differential pressure between the first space and the second space is greater than the threshold differential pressure.

24. The device of claim 1, wherein the at least one movable element comprises a single movable element.

25. The device of claim 1, wherein the at least one movable element comprises a ball.

* * * * *